(12) United States Patent
Klein et al.

(10) Patent No.: US 10,467,017 B2
(45) Date of Patent: Nov. 5, 2019

(54) CONFIGURATION OF PRIMARY AND SECONDARY DISPLAYS

(71) Applicant: Microsoft Technology Licensing, LLC, Redmond, WA (US)

(72) Inventors: Christian Klein, Duvall, WA (US); Robert Joseph Disano, Seattle, WA (US); Sammy Chiu, Seattle, WA (US); Katherine Blair Huffman, Seattle, WA (US); Connor Lawrence Weins, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/797,266

(22) Filed: Oct. 30, 2017

(65) Prior Publication Data

US 2018/0330694 A1    Nov. 15, 2018

Related U.S. Application Data

(60) Provisional application No. 62/505,942, filed on May 14, 2017.

(51) Int. Cl.
*G06F 9/4401* (2018.01)
*G06F 1/16* (2006.01)
(Continued)

(52) U.S. Cl.
CPC .......... *G06F 9/4411* (2013.01); *G06F 1/1615* (2013.01); *G06F 1/1616* (2013.01); *G06F 1/1618* (2013.01); *G06F 1/1641* (2013.01); *G06F 1/1647* (2013.01); *G06F 1/1677* (2013.01); *G06F 1/1681* (2013.01); *G06F 1/1692* (2013.01); *G06F 1/1694* (2013.01); *G06F 3/011* (2013.01); *G06F 3/017* (2013.01);
(Continued)

(58) Field of Classification Search
CPC ...................................................... G09G 5/003
USPC ........................................................ 345/428
See application file for complete search history.

(56) References Cited

U.S. PATENT DOCUMENTS 5,761,485 A    6/1998 Munyan
6,222,507 B1    4/2001 Gouko
(Continued)

FOREIGN PATENT DOCUMENTS

EP    1538549    6/2005
EP    1868068 A1    12/2007
(Continued)

OTHER PUBLICATIONS

"Acer ICONIA—User Guide", Retrieved From: https://www.manualsllb.com/manual/353947/Acer-Iconia-6120.html, Nov. 1, 2010, 110 Pages.
(Continued)

*Primary Examiner* — Jin Ge

(57) ABSTRACT

Techniques for configuration of primary and secondary displays are described. In one or more implementations, an apparatus such as a mobile device includes multiple interconnected display devices that can be configured in different ways, such as output primary, input primary, sensor primary, and so forth. At least one implementation enables different zones of a single display surface to be configured as primary and secondary for different purposes, such as input and/or output.

20 Claims, 10 Drawing Sheets

(51) Int. Cl.
*G06F 3/14* (2006.01)
*G09G 5/00* (2006.01)
*G09G 5/14* (2006.01)
*G06F 3/01* (2006.01)
*G06F 3/0354* (2013.01)
*G06F 3/041* (2006.01)
*G06F 3/0488* (2013.01)
*G06F 9/445* (2018.01)
*G06F 3/0487* (2013.01)
*G06K 9/00* (2006.01)

(52) U.S. Cl.
CPC ........ *G06F 3/03545* (2013.01); *G06F 3/0418* (2013.01); *G06F 3/0487* (2013.01); *G06F 3/04883* (2013.01); *G06F 3/1423* (2013.01); *G06F 3/1446* (2013.01); *G06F 9/4401* (2013.01); *G06F 9/445* (2013.01); *G06F 9/44505* (2013.01); *G09G 5/003* (2013.01); *G09G 5/14* (2013.01); *G06F 1/1643* (2013.01); *G06F 3/041* (2013.01); *G06K 9/00154* (2013.01); *G09G 2320/0626* (2013.01); *G09G 2320/0686* (2013.01); *G09G 2340/0407* (2013.01); *G09G 2354/00* (2013.01); *G09G 2356/00* (2013.01)

(56) References Cited

U.S. PATENT DOCUMENTS

| | | | |
|---|---|---|---|
| 7,184,025 B2 | 2/2007 | Williams et al. | |
| 7,190,375 B2 | 3/2007 | Dresevic et al. | |
| 7,397,485 B2 | 7/2008 | Miller et al. | |
| 9,092,183 B2 | 7/2015 | Reeves et al. | |
| 9,189,773 B2 | 11/2015 | Webber | |
| 9,224,355 B2 | 12/2015 | Wu et al. | |
| 9,298,282 B2 | 3/2016 | Liberty | |
| 9,406,281 B2 | 8/2016 | Lee | |
| 9,489,080 B2 | 11/2016 | Seo et al. | |
| 9,524,139 B2 | 12/2016 | Aurongzeb et al. | |
| 9,549,060 B2 | 1/2017 | Wohlert et al. | |
| 9,600,595 B2 | 3/2017 | DeLuca et al. | |
| 9,619,008 B2 | 4/2017 | North et al. | |
| 2005/0160371 A1 | 7/2005 | Karson et al. | |
| 2005/0270278 A1 | 12/2005 | Ouchi | |
| 2006/0034042 A1* | 2/2006 | Hisano | G06F 1/1616 361/679.04 |
| 2007/0075915 A1* | 4/2007 | Cheon | G06F 1/1616 345/1.1 |
| 2008/0024388 A1 | 1/2008 | Bruce | |
| 2009/0201246 A1 | 8/2009 | Lee et al. | |
| 2009/0303208 A1* | 12/2009 | Case, Jr. | G06F 1/1616 345/204 |
| 2010/0081475 A1 | 4/2010 | Chiang et al. | |
| 2010/0182265 A1* | 7/2010 | Kim | G06F 1/1616 345/173 |
| 2010/0225601 A1 | 9/2010 | Homma et al. | |
| 2010/0245106 A1* | 9/2010 | Miller | G06F 1/1618 340/686.1 |
| 2010/0321275 A1* | 12/2010 | Hinckley | G06F 1/1618 345/1.3 |
| 2010/0333041 A1 | 12/2010 | Fabrick | |
| 2011/0074717 A1 | 3/2011 | Yamashita | |
| 2011/0263339 A1 | 10/2011 | Cole et al. | |
| 2011/0304537 A1 | 12/2011 | Eruchimovitch et al. | |
| 2012/0050177 A1 | 3/2012 | Simmons | |
| 2012/0113019 A1 | 5/2012 | Anderson | |
| 2012/0242599 A1 | 9/2012 | Seo et al. | |
| 2012/0266098 A1 | 10/2012 | Webber | |
| 2012/0306768 A1 | 12/2012 | Bailey | |
| 2012/0327133 A1 | 12/2012 | Eguchi | |
| 2013/0033415 A1 | 2/2013 | Chang et al. | |
| 2013/0076591 A1 | 3/2013 | Sirpal et al. | |
| 2013/0169564 A1* | 7/2013 | Sano | G06F 1/1647 345/173 |
| 2013/0219329 A1 | 8/2013 | Tomimori | |
| 2013/0234929 A1 | 9/2013 | Libin | |
| 2013/0321264 A1* | 12/2013 | Park | G06F 3/01 345/156 |
| 2013/0321340 A1* | 12/2013 | Seo | G06F 1/1641 345/174 |
| 2014/0101575 A1* | 4/2014 | Kwak | G06F 1/1616 715/761 |
| 2014/0101579 A1 | 4/2014 | Kim et al. | |
| 2014/0132514 A1 | 5/2014 | Kuzara et al. | |
| 2014/0145966 A1 | 5/2014 | Gardenfors | |
| 2014/0210737 A1 | 7/2014 | Hwang et al. | |
| 2014/0267176 A1 | 9/2014 | Bathiche et al. | |
| 2014/0267178 A1 | 9/2014 | Bathiche et al. | |
| 2014/0375596 A1 | 12/2014 | Kim et al. | |
| 2015/0116362 A1 | 4/2015 | Aurongzeb et al. | |
| 2015/0116364 A1 | 4/2015 | Aurongzeb et al. | |
| 2015/0234629 A1 | 6/2015 | Park | |
| 2015/0212545 A1 | 7/2015 | Ding | |
| 2015/0227225 A1* | 8/2015 | Park | G06F 1/1641 345/173 |
| 2015/0242039 A1 | 8/2015 | Chang et al. | |
| 2015/0261374 A1 | 9/2015 | Eguchi et al. | |
| 2015/0324162 A1* | 11/2015 | Kim | G06F 3/1438 345/169 |
| 2016/0011719 A1 | 1/2016 | Andersson | |
| 2016/0034059 A1 | 2/2016 | Graf et al. | |
| 2016/0041757 A1 | 2/2016 | Sirpal et al. | |
| 2016/0086568 A1 | 3/2016 | Imamura et al. | |
| 2016/0098063 A1* | 4/2016 | Lee | G06F 1/1641 345/659 |
| 2016/0249749 A1 | 9/2016 | Bull | |
| 2017/0031434 A1 | 2/2017 | Files et al. | |
| 2017/0038934 A1 | 2/2017 | Sirpal et al. | |
| 2017/0052751 A1* | 2/2017 | Aurongzeb | H04N 7/15 |
| 2017/0139535 A1 | 5/2017 | Files et al. | |
| 2017/0193489 A1* | 7/2017 | Jeon | G06F 3/0346 |
| 2017/0337025 A1* | 11/2017 | Finnan | G06F 1/16 |
| 2018/0329508 A1 | 11/2018 | Klein et al. | |
| 2018/0329574 A1 | 11/2018 | Klein et al. | |
| 2018/0329718 A1 | 11/2018 | Klein et al. | |

FOREIGN PATENT DOCUMENTS

| | | |
|---|---|---|
| EP | 2674834 A2 | 12/2013 |
| EP | 3093759 A2 | 11/2016 |
| IN | 2024CHE2014 | 1/2016 |
| WO | 2010028403 A1 | 3/2010 |
| WO | 2015191468 A1 | 12/2015 |

OTHER PUBLICATIONS

"Windows 10—Wikipedia", Retrieved From: https://en.wikipedia.org/w/index.php?title=Windows10&oldid=779989647, Jul. 9, 2018, 47 Pages.

"International Search Report and Written Opinion Issued in PCT Application No. PCT/US18/028756", dated Jul. 4, 2018, 13 Pages.

"International Search Report and Written Opinion Issued in PCT Application No. PCT/US18/028775", dated Sep. 13, 2018, 17 Pages.

"Invitation to Pay Additional Fee Issued in PCT Application No. PCT/US18/028775", dated Jul. 6, 2018, 11 Pages.

"International Search Report and Written Opinion Issued in PCT Application No. PCT/US18/028778", dated Jul. 18, 2018, 15 Pages.

"International Search Report & Written Opinion for PCT Patent Application No. PCT/US18/028780", dated Oct. 26, 2018, 17 Pages.

"Invitation to Pay Additional Fee Issued in PCT Application No. PCT/US18/028780", dated Jul. 20, 2018, 10 Pages.

"Accessibility Requirements for People with Low Vision", Retrieved from <https://w3c.github.io/low-vision-a11y-tf/requirements.html> on Jun. 7, 2017, Sep. 26, 2016, 25 pages.

Murph, "Kyocera Echo review", https://www.engadget.com/2011/04/13/kyocera-echo-review/, Apr. 13, 2011, 14 pages.

"Non Final Office Action Issued in U.S. Appl. No. 15/834,378", dated Nov. 23, 2018, 12 Pages.

(56) References Cited

OTHER PUBLICATIONS

"Final Office Action Issued in U.S. Appl. No. 15/834,378", dated May 23, 2018, 9 Pages.
"Non Final Office Action Issued in U.S. Appl. No. 15/685,219", dated Jul. 15, 2019, 11 pages.

* cited by examiner

US 10,467,017 B2

CONFIGURATION OF PRIMARY AND SECONDARY DISPLAYS

RELATED APPLICATION

This application claims priority under 35 U.S.C. § 119(e) to U.S. Provisional Patent Application No. 62/505,942, filed 14 May 2017 and titled "Multi-Display Device Techniques," the entire disclosure of which is incorporated by reference in its entirety.

BACKGROUND

Mobile devices provide today's user with a variety of different functionalities, and in many instances allow the user to directly interact with objects displayed via touch-sensitive display devices. Devices having multiple display surfaces or a single large display surface, however, introduce complexities that are typically not resolved using conventional display management techniques. For instance, a device with multiple display surfaces connected by a hinge can enable the different display surfaces to be placed at different positions relative to one another. Determining how to manage various attributes of the different display surfaces (e.g., power, resolution, and so forth) is challenging based on the number of available device positions. Further, for a device with a single large display surface, managing various input and output characteristics of the display surface is challenging due to the variety of use cases available for such a device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for configuration of primary and secondary displays are described. In one or more implementations, an apparatus such as a mobile device includes multiple interconnected display devices that can be configured in different ways, such as output primary, input primary, sensor primary, and so forth. At least one implementation enables different zones of a single display surface to be configured as primary and secondary for different purposes, such as input and/or output.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
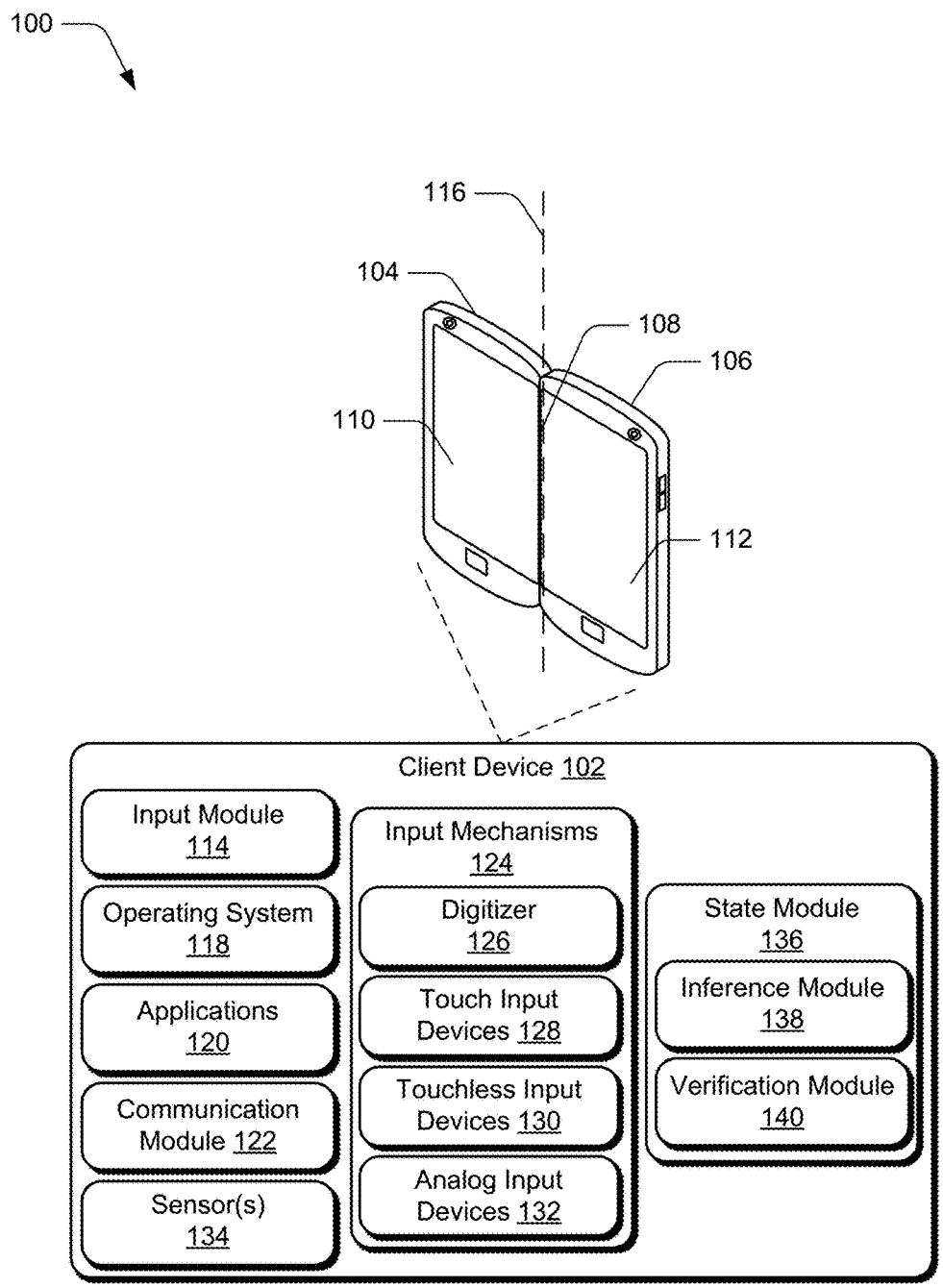
FIG. 1 is an illustration of an environment in an example implementation that is operable to employ the techniques described herein in accordance with one or more implementations.

Techniques for configuration of primary and secondary displays are described. In one or more implementations, an apparatus such as a mobile device includes multiple interconnected display devices. The apparatus, for instance, includes two (or more) display devices connected by a hinge such that the display devices can be positioned at different angles relative to one another. Generally, this supports different usage scenarios of the apparatus. An apparatus with multiple display devices introduces a number of challenges from a resource usage perspective. For instance, multiple display devices typically draw more power to drive the display devices than does a single display device. Further, multiple display devices typically utilize more computing resources than single devices, such as processor bandwidth and memory to manage input and output to multiple display devices in contrast with a single display device. Techniques described herein mitigate these issues.

For instance, techniques described herein enable display devices on a multi-display client device to be configured in various ways. For instance, based on a determined state condition of the client device, a first display device is designated as output primary, and a second display device is designated as output secondary. The output primary display is optimized for visual output, such as by maintaining a higher display brightness and/or resolution for the output primary display than for the output secondary display. This conserves power and battery life by reducing power utilization by the output secondary display.

As further described below, display devices on a multi-display client device can also be designated as input primary and input secondary, and/or sensor primary and sensor secondary. Generally, this causes a display device that is designated as input/sensor primary to be optimized for user input and/or sensor input, and reduces power and processor usage of an input/sensor secondary display by reducing power and processor bandwidth utilized by input devices and sensors on the input/sensor secondary display.

Techniques described herein also enable designation of different zones of a single integrated display surface, such as output primary zones and input primary zones. A state condition for a single display surface, for instance, can be used to infer a first portion of the display surface that is to be output primary and/or input primary, and a second portion of the display surface that is to be output secondary and/or input secondary.

In the following discussion, an example environment is first described that is operable to employ techniques described herein. Next, a section entitled "Example Implementation Scenarios" describes some example implementation scenarios in accordance with one or more implementations. Following this, a section entitled "Example Procedures" describes some example procedures in accordance with one or more implementations. Finally, a section entitled "Example System and Device" describes an example system and device that are operable to employ techniques discussed herein in accordance with one or more implementations.

Having presented an overview of example implementations in accordance with one or more implementations, consider now an example environment in which example implementations may by employed.

Example Environment

FIG. 1 is an illustration of an environment 100 in an example implementation that is operable to employ techniques for configuration of primary and secondary displays discussed herein. The environment 100 includes a client device 102 which can be configured in various ways. In at least one implementation, the client device 102 is configured for mobile use, such as a mobile phone, a tablet computer, a wearable device, a handheld gaming device, a media player, and so on. The client device 102 includes a display device 104 and a display device 106 that are connected to one another by a hinge 108. Further, the display device 104 includes a touch surface 110, and the display device 106 includes a touch surface 112. The client device 102 also includes an input module 114 configured to process input received via one of the touch surfaces 110, 112 and/or via the hinge 108.

According to various implementations, the display devices 104, 106 generally represent functionality for visual output for the client device 102. Additionally, the display devices 104, 106 represent functionality for receiving various types of input, such as touch input, stylus input, touchless proximity input, and so forth via one or more of the touch surfaces 110, 112, which can be used as visual output portions of the display devices 104, 106.

Generally, the hinge 108 is configured to rotationally move about a longitudinal axis 116 of the hinge 108 to allow an angle between the display devices 104, 106 to change. In this way, the hinge 108 allows the display devices 104, 106 to be connected to one another yet be oriented at different angles and/or planar orientations relative to each other. In at least some implementations, the touch surfaces 110, 112 may represent different portions of a single integrated and continuous display surface that can be bent along the hinge 108. Thus, the hinge 108 may represent a separate component that hingeably attaches the two separate touch surfaces 110, 112, or the hinge 108 may represent a portion of a single integrated display surface that includes the touch surfaces 110, 112 and about which the touch surfaces 110, 112 can bend.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 10.

The client device 102 includes a variety of different functionalities that enable various activities and tasks to be performed. For instance, the client device 102 includes an operating system 118, applications 120, and a communication module 122. Generally, the operating system 118 is representative of functionality for abstracting various system components of the client device 102, such as hardware, kernel-level modules and services, and so forth. The operating system 118, for instance, can abstract various components (e.g., hardware, software, and firmware) of the client device 102 to enable interaction between the components and applications running on the client device 102.

The applications 120 are representative of functionality for performing different tasks via the client device 102. Examples of the applications 120 include a word processing application, a spreadsheet application, a web browser, a gaming application, and so forth. The applications 120 may be installed locally on the client device 102 to be executed via a local runtime environment, and/or may represent portals to remote functionality, such as cloud-based services, web apps, and so forth. Thus, the applications 120 may take a variety of forms, such as locally-executed code, portals to remotely hosted services, and so forth.

The communication module 122 is representative of functionality for enabling the client device 102 to communicate over wired and/or wireless connections. For instance, the communication module 122 represents hardware and logic for communicating data via a variety of different wired and/or wireless technologies and protocols.

To enable various types of input to be received and utilized, the client device 102 includes input mechanisms 124. Generally, the input mechanisms 124 represent different functionalities for receiving input to the client device 102, and include a digitizer 126, touch input devices 128, touchless input devices 130, and analog input devices 132. Examples of the input mechanisms 124 include gesture-sensitive sensors and devices (e.g., such as touch-based sensors), a stylus, a touch pad, accelerometers, a microphone with accompanying voice recognition software, and so forth.

The digitizer 126 represents functionality for converting various types of input to the touch input devices 128, the touchless input devices 130, and the analog input devices 132 into digital data that can be used by the client device 102 in various ways. Generally, the touch input devices 128 represent functionality for receiving touch input to the client device 102. Examples of the touch input devices include the display devices 104, 106, the hinge 108, a touch pad, and so forth. The touch input devices 128, for instance, may be separate or integral with the display devices 104, 106, with integral examples including gesture-sensitive displays with integrated touch-sensitive sensors. The touchless input devices 130 generally represent functionality for detecting input that does not involve physical contact with the client device 102, such as a camera for detecting touchless gestures, proximity detection via capacitance sensing, and so forth.

The analog input devices 132 represent hardware mechanisms of the client device 102 that are usable to generate different physical quantities that represent data that can be interpreted as input to the client device 102. Examples of input that can be detected via the analog input devices 132 include angle of the display devices 104, 106 relative to one another, a position in which a user grips the client device 102, a position of the client device 102 relative to gravity, and so forth. The client device 102, for instance, includes sensors 134 that can be leveraged to implement the analog input devices 132. Generally, the sensors 134 represent functionality for detecting different physical phenomena relative to the client device 102.

The sensors 134, for example, can include motion sensors and/or orientation sensors, such as accelerometers and/or gyroscopes configured to detect physical movement and orientation of the display devices 104, 106 in space or relative movement and orientation with respect to a reference position. Further, the sensors 134 can include proximity sensors to detect a proximity of the user to one of the display devices 104, 106. The sensors 134 may also include audio sensors (e.g., a microphone and/or microphone array) to detect audio associated with an audio source (e.g., the user), such as voice commands issued by the user, and the audio can be used to determine a relative direction of the user with respect to the display devices 104, 106 and which of the display devices 104, 106 is substantially facing the user. Additionally, the sensors 134 can include grip sensors, such as touch sensors, configured to detect how a user is holding the client device 102. Accordingly, a variety of different sensors 134 disposed on each of the display devices 104, 106 and can be implemented to detect various different types of digital and/or analog input.

In at least one implementation, one or more sensors 134 can measure a hinge angle of the hinge 108, and the one or more sensors 134 can provide the hinge angle as digital data usable by the client device 102 to perform various actions. For example, the sensors 134 can include one or more hinge sensors configured to detect a hinge angle between the display devices 104, 106. Thus, the hinge 108 can be leveraged as a mechanism to generate input data by measurement of a physical variable, such as hinge angle of the hinge 108.

Further to techniques for configuration of primary and secondary displays described herein, the client device 102 includes and/or makes use of a state module 136, which includes an inference module 138 and a verification module 140. The state module 136, for example, is included as part of an application or system software, such as the operating system 118. Alternatively, the state module 136 represents a different standalone application or other functionality.

Generally, the state module 136 represents functionality for ascertaining, based on state conditions of the client device 102, how to configure functionality of the display devices 104, 106. For instance, the state module 136 can utilize various types of state information to configure one or more of the display devices 104, 106 as output primary or secondary, input primary or secondary, or sensor primary or secondary.

To assist the state module 136, the inference module 138 represents functionality for inferring a user's intended primary and/or secondary display or input and/or output purposes. The inference module 138, for instance, is configured to utilize input signals, such as those detected by the input mechanisms 124 and/or the sensors 134, to determine a state of the client device 102 based on an orientation and a relative position of the client device 102 relative to the user, the ground, or another reference location, to make such an inference. Alternatively or additionally, the inference module 138 determine a state of the client device 102 based on functionality executing on the client device 102 (e.g., an application 120), user interaction with and/or proximity to the client device 102, and so forth.

The verification module 140 is representative of functionality to validate and/or verify decisions of the inference module 138 concerning a state of the client device 102. In at least one implementation, the verification module 140 is configured to utilize various sensor signals from the sensors 134 to determine context information associated with the client device 102 in relation to the user and how the user is using the device. In addition, the verification module 140 can use the context information to verify a gesture being performed and/or to verify the inference made by the inference module 138. By verifying the gesture being performed, the inference module 138 can avoid inadvertent or unintentional input being recognized as a gesture. In addition, by verifying whether the inference module 138 correctly determined which of the display devices 104, 106 is to be used as output primary/secondary and/or input primary/secondary, inference errors can be identified and corrected. Thus, the user's experience can be improved over conventional techniques by automatically determining and configuring a display device as output primary/secondary, or input primary/secondary, without requiring the user to explicitly select the primary display. Further discussion of this and other features is provided below.

Having described an example environment in which the techniques described herein may operate, consider now a discussion of some example implementation scenarios in accordance with one or more implementations.

Example Implementation Scenarios

This section describes some example implementation scenarios for configuration of primary and secondary displays in accordance with one or more implementations. The implementation scenarios may be implemented in the environment 100 described above, the system 1000 of FIG. 10, and/or any other suitable environment. The implementation scenarios and procedures, for example, describe example operations of the client device 102.

Figure 2:
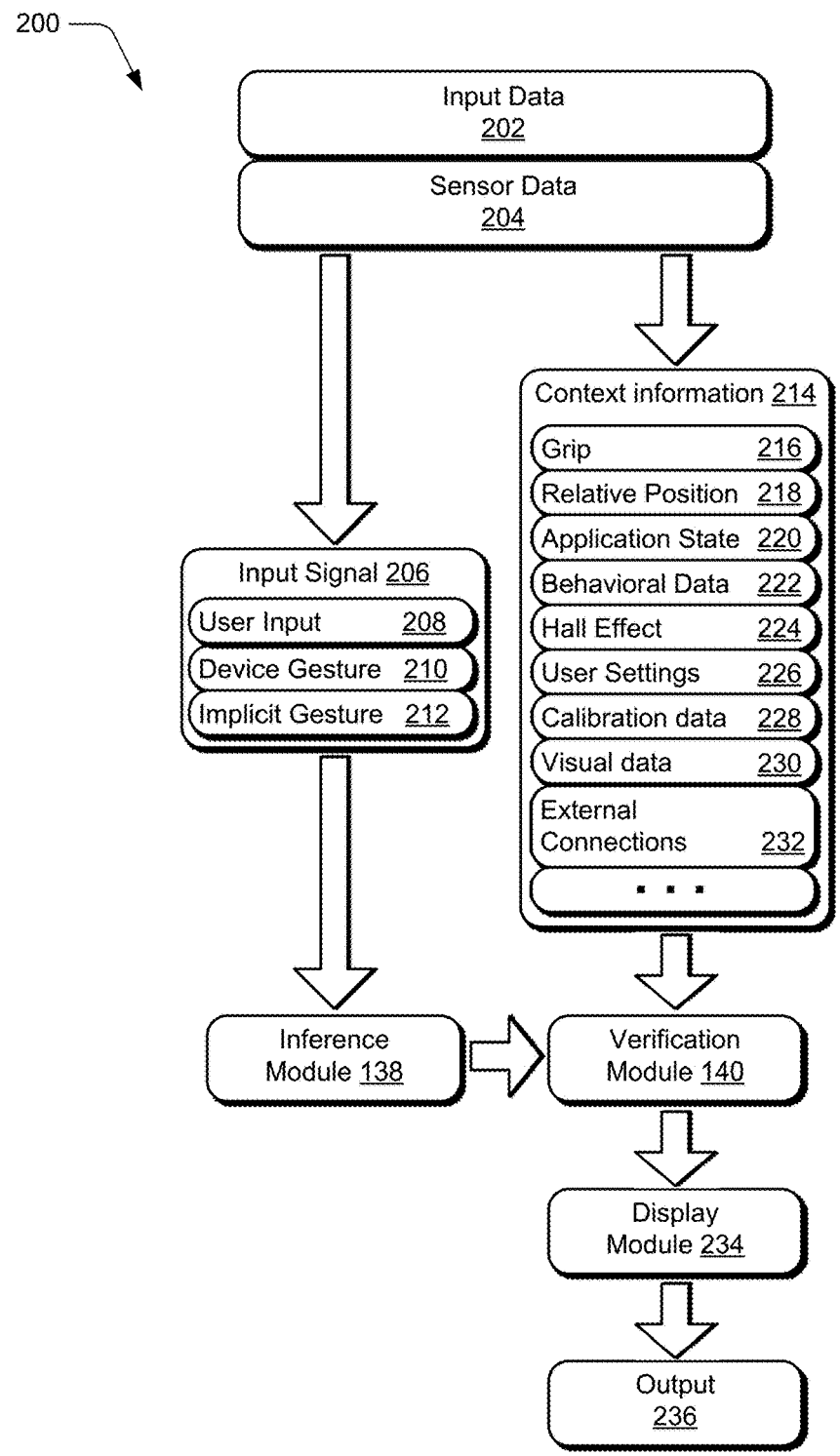
FIG. 2 depicts an example implementation scenario for using state information to determine a display device to be designated as output primary, input primary, and/or sensor primary in accordance with one or more implementations.

FIG. 2 illustrates an example implementation scenario 200 for using state information to determine a display device to be designated as output primary, input primary, and/or sensor primary. In the illustrated example, input data 202 and/or sensor data 204 is used to generate an input signal 206. Generally, the input data 202 and/or the sensor data 204 represents data generated by the input mechanisms 124 and/or the sensors 134. The input signal 206 can be detected from a variety of different types of input, such as a touch input (e.g., via a finger press or stylus input) to the touch surface 110 or the touch surface 112 of the client device 102, a press of a hardware button, a bend in the hinge 108 of the client device 102, a voice command via an audio sensor, or any combination of input mechanisms.

In implementations, the input signal 206 can include a user input 208, a device gesture 210, and/or an implicit gesture 212. The user input 208 represents any suitable type of intentional input from a user, such as a touch input to the display device 104 and/or the display device 106, voice input, and/or input via some other input mechanism 124 and/or sensor 134. The device gesture 210 is recognized as a physical movement of at least one of the display devices 104, 106 of the client device 102. For instance, the physical movement leverages the hinge 108 such that a hinge angle between the display devices 104, 106 is changed. The user, for example, may open the client device 102 from a closed posture, or further open the client device 102 from an open posture to a flipped posture where the display devices 104, 106 face away from each other in opposite directions. Alternatively, if the client device 102 is in the flipped posture, the user may turn or flip the device over to see the opposite side, which includes a display device that was previously facing away from the user and is now facing toward the user. In at least one implementation, the device gesture 210 represents a type of the user input 208.

The implicit gesture 212 may include physical movement of the client device 102 by the user where the user's intent is not to provide explicit input via the implicit gesture 212, but rather the user is doing something naturally with the client device 102 that can be recognized and detected as a gesture from the system's point of view. For instance, the user may lift the client device 102 from a stationary location (e.g., on a table, or in a pocket), or turn the device to cause a display device to face away from the user and toward another person. From a system point of view, these actions can be considered to be gestures for input, even though the user may not explicitly intend them to be gestures.

Further to the scenario 200, the inference module 138 is configured to use the input signal 206 to infer an output primary display and/or an input primary display. For instance, the inference module 138 is configured to determine which of the display devices 104, 106 the user intends to be employed as an output primary display and/or an input primary display.

The input data 202 and/or the sensor data 204 may alternatively or additionally be leveraged to generate context information 214 to be used for interpreting the input signal 206. For instance, the verification module 140 is configured to utilize the context information 214 to verify that the input signal 206 was actually an intentional input rather than an inadvertent or accidental input. Further, the verification module 140 is configured to use the context information 214 to refine the determination made by the inference module 138 as to which display devices 104, 106 is to be a primary display for purpose of output and/or input. The context information 214 can be determined based on a variety of support signals that can be interpreted as context related to the client device 102 and/or a user of the client device 102. This context information allows the system to better infer which display device the user intends to use as the primary screen.

The context information 214 can include a variety of different types and/or instances of data or signals, such as one or more of grip 216, relative position 218, application state 220, behavioral data 222, hall effect 224, user settings 226, calibration data 228, visual data 230, and external connections 232. This is not an exhaustive list. Rather, these types of context information 214 are described as examples of the context information 214, and are not to be construed as limiting. Further, the client device 102 can utilize some or all of the context information 214, and can use any subset or combination of different types of the context information 214.

The grip 216 indicates how the user is grasping or holding the client device 102 during and/or after the input signal 206. For instance, the grip 216 can be detected by the sensors 134, such as capacitive strips on the outside of the client device 102 or separate capacitive sensors on the rear exterior of the client device 102. Alternatively or in addition, the grip 216 can be detected based on a capacitance of a display surface on the front of the client device 102. The sensors 134 can detect whether the user has fingers wrapped around the client device 102, which hand (e.g., left or right hand) the user is using to hold the client device 102, in which of a variety of different device postures the user is holding the device, and so on. Accordingly, the grip 216 indicates how the user is holding the device, which is usable to infer how the user intends to use the device.

The relative position 218 refers to a relative position of the client device 102 in relation to the user of the client device 102, in relation to the ground, and/or in relation to another reference location. For example, the relative position 218 can indicate whether the client device 102 is resting on a surface or whether a display device is facing the user. In implementations, the relative position 218 can be used to determine a current posture of the client device 102. Various types of sensors 134 can be employed to determine the relative position 218, including cameras, accelerometers, magnetometers, and so on.

The application state 220 represents identities and/or application types for one or more applications that are open on the client device 102. The application state 220 may also be display specific, such as which application 120 is open on which particular display device 104, 106.

The behavioral data 222 is representative of how the user tends to interact with the client device 102 or particular applications executed on the client device 102. For example, when using the client device 102 in a posture that allows the user to view both the display devices 104, 106 simultaneously, the user may tend to run certain applications on the left side (e.g., display device 104) and other applications on the right side (e.g., display device 106). In another example, the user may generally take notes on the right side (e.g., display device 106) of the client device 102 because the user is right-handed, and as a result, the user's hand does not obscure the other display device (e.g., display device 104).

There are many different reasons why a user may have particular preferences related to how the user tends to use the client device 102. The behavioral data 222, although it may not explicitly represent preferences in the form of settings, includes behavioral information about how the user uses the device. Further, using the behavioral data 222, some user actions can be anticipated. For example, when a notetaking application is launched, the system can use the behavioral data 222 to launch the notetaking application via a particular display device of the display devices 104, 106 because the system knows the user has a preference for viewing the notetaking application via the particular display device and that the user likely intends that particular display device to be the input primary display.

The hall effect 224 refers to the production of a potential difference across an electrical conductor when a magnetic field is applied in a direction perpendicular to that of the flow of current. Hall effect sensors (e.g., magnetometer) can detect magnetic fields in close proximity. In implementations, the hall effect 224 can be used to detect when the client device 102 is opened from a closed posture to an open posture and to automatically turn on one or both of the display devices 104, 106. Alternatively or additionally, the hall effect 224 can be used to turn the display devices 104, 106 off when the client device 102 is manipulated into the closed posture.

The user settings 226 can indicate how the user prefers to use the client device 102, particularly with respect to ergonomics-related user settings that are set by the user or by default. Ergonomics-related user settings can be used to further refine the input signal 206 (e.g., left/right handedness can be used to predict a likely flip direction, or hand size information can be used for more reliable grip detection). By using information associated with the user settings 226, the client device 102 can predict which direction the user is going to turn the device when the user's intent is to flip it over. This functionality can be useful in differentiating situations that are similar in nature, such as a first situation where the user rotates the device 180 degrees to see the reverse side, versus a second situation where the user rotates the device 180 degrees to show a friend content displayed via the primary display. In the first situation, the primary display can be changed to the reverse side to enable the user to view content via the reverse side. In the second situation, however, the user may not desire the primary display to change but may instead desire the primary display to temporarily face away from the user in order to show the displayed content to the friend, likely with the intent of then turning the device back around to continue viewing the original primary display. Accordingly, the user settings 226, alone or in combination with other context information 214, can be used to disambiguate similar situations.

The calibration data 228 describes information about the user, such as user properties that the system is aware of. For example, the calibration data 228 can include hand dimensions representing the size and shape of the user's hand(s) that is grasping the client device 102. The hand dimensions can be used for more reliable grip detection. Further, the hand dimensions can be used to identify the user, the user's handedness (left or right), a shape of the user's fingers, and so on. This information can allow the system to more robustly detect how the user is holding the device, which can then be used to infer which display device is likely intended to be the output primary display and/or the input primary display based on the way the user would predictably perform the device gesture 210 or the implicit gesture 212.

The visual data 230 refers to information captured via an image capturing device, such as a camera of the client device 102. For example, the client device can include multiple integrated cameras. Each display device 104, 106, for instance, can be associated with one or more cameras, such as front-facing or rear-facing cameras. The cameras can capture images and/or video to detect whether a corresponding display device is facing the user. In implementations, the cameras can be used to detect whether the user is looking at a particular display device.

The external connections 232 refer to current connections between the client device 102 and one or more external devices. For example, the client device 102 can be connected to one or more external displays to display content, such as to give a presentation to a group of people. In this example, attention is given to the external device rather than the client device 102. Thus, the external device is likely intended to be the output primary display, whereas one or more of the display devices 104, 106 of the client device 102 are likely intended to be the input primary display.

Once the verification module 140 verifies the inferred primary display or corrects the inferred primary display, a display module 234 provides an output 236 for controlling the client device 102. The output 236, for example, indicates which of the display devices 104, 106 is designated as an output primary display and/or an input primary display. The output 236 may also specify a particular action or set of actions to be performed relative to a primary display. For example, the display module 234 is configured to control power to each of the display devices 104, 106, and control which of the display devices 104, 106 is to be used as the output primary display for output of content. In an example, the display module 234 is configured to cause an application to be displayed via a particular display device, change a power state of a display device (e.g., place a display device that is not intended to be used as the primary display into a low power state or "off" state, or turn on or wake a display device that is inferred to be the user's intended output primary display), and so on.

In an example implementation, one of the display devices 104, 106 can be designated as a primary display for one purpose, and a secondary display for another purpose. For instance, based on the input signal 206 and the context information 214, the output 236 can indicate that a particular display device is a primary display for purpose of receiving input to the client device 102, but is a secondary display for purpose of displaying output from the client device 102. Thus, the display device can be optimized for input and output characteristics of the display may be configured to deprioritize output. Further aspects for leveraging a division between primary and secondary purposes are detailed below.

In another example implementation, the sensors 134 can be controlled based on which display device 104, 106 is designated as primary/input primary, and which display device 104, 106 is designated as secondary/input secondary. For instance, in a display device that is designated as input primary, sensors 134 that are physically positioned within and/or adjacent the display device can be prioritized over other sensors 134 that are positioned within and/or adjacent a different display device that is designated as input secondary. Sensors 134 that that are positioned on a display device that is input secondary, for instance, can be tuned down and/or turned off to reduce power consumption.

Further, in some implementations, different sensors 134 can be used in different implementations based on which gesture is detected, rather than using all the sensors 134 all the time. This can reduce power consumption and extend battery life. For instance, when the user flips the client device 102 over to view the reverse side, certain sensors (e.g., proximity sensors) can be considered for inferring the user's intended primary display. In contrast, when a different gesture is performed, such as a gesture that opens the client device 102, the system can rely less on the proximity sensors and more on grip sensors. For instance, different sensor signals can be weighted differently based on different gestures. Accordingly, the client device 102 can determine, during performance of the gesture, which gesture is being performed and based on that determination, consider particular sensor signals to refine that determination (e.g., to verify that the determined gesture is in fact being performed). Conditionally considering signals from various sensors 134, rather than simply using all the sensors 134 all the time, reduces required processing bandwidth and power consumption, which can lead to a longer battery life.

Figure 3:
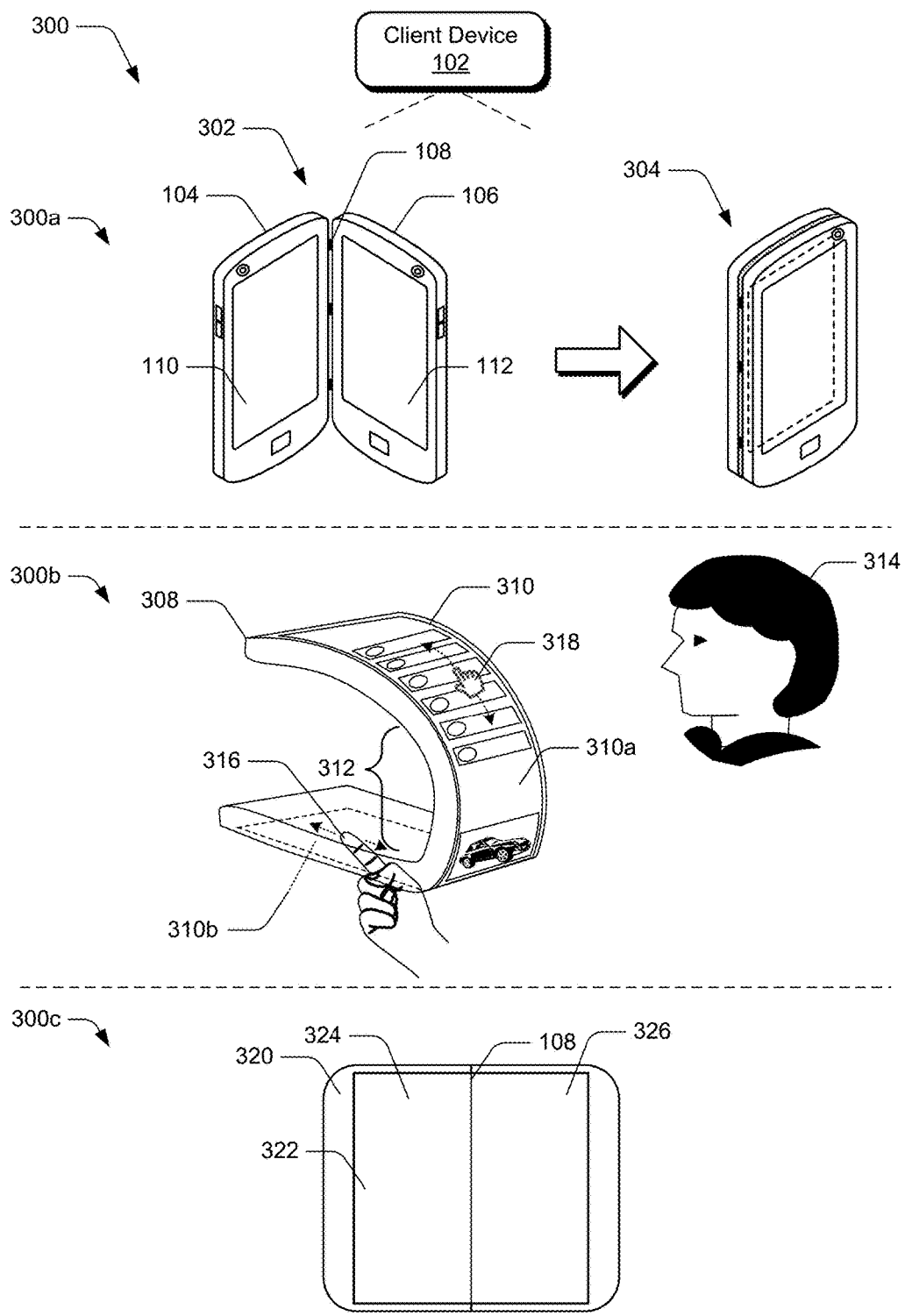
FIG. 3 depicts example implementation scenarios for devices that are configurable for primary and secondary displays in accordance with one or more implementations.

FIG. 3 depicts example implementation scenarios 300 for devices that are configurable for primary and secondary displays as described herein. The scenarios 300 include various different configurations of devices having multiple touch surfaces. The devices discussed in the scenarios 300, for instance, represent different instances of the client device 102.

For example, in scenario 300*a*, the display devices 104, 106 are physically connected to one another via the hinge 108 and include the touch surfaces 110, 112, respectively. The hinge 108 may be implemented in various ways, such as a pivot, a joint, a swivel, and flexible display region, and so on. Generally, the hinge 108 enables the display devices 104, 106 to be positioned in a variety of different postures, such as a "closed book" posture where the touch surfaces 110, 112 face each other. Additionally, the display devices 104, 106 can be positioned in an "open book" posture as shown in the configuration 302. In the configuration 302, the touch surfaces 110, 112 are positioned relative to one another such that a user can view content presented on both touch surfaces 110, 112, such as at an angle between 80 degrees and 180 degrees. In yet another example position, the touch surfaces 110, 112 can be parallel with one another in a side-by-side configuration where both touch surfaces 110, 112 face the same direction, such as shown below in the scenario 300c. In at least one implementation, the display devices 104, 106 can be positioned such that the touch surfaces 110, 112 face substantially opposite directions, as illustrated in example configuration 304. According to various implementations, a relative orientation of the touch surfaces 110, 112 can be interpreted to designate a particular touch surface as being either input primary or output primary. Further, the relative orientation can be used to configure sensors 134 for the display devices 104, 106.

FIG. 3 further depicts a scenario 300b, which includes a bendable device 308 having a display device 310 that is bendable about a flexible region 312 into different configurations, causing at least a portion of the display device 310 to be hidden from the user's view. For example, the bendable device 308 can be shaped into a position having a first portion 310a of the display device 310 facing the user and a second portion 310b of the display device 310 that is non-planar with the first portion 310a, such that the second portion 310b of the display device 310 is essentially "on the backside" of the bendable device 308. Accordingly, a variety of different positions and configurations of the bendable device 308 are contemplated, and are not necessarily limited to a front/back configuration.

In at least one implementation, a relative orientation of the first portion 310a and the second portion 310b can determine which portion is input primary, and which portion is output primary. For instance, consider that a user 314 is wearing the bendable device 308 on the user's wrist, such as a smartwatch or other wearable smart appliance. The first portion 310a of the display device 310 is positioned such that the user 314 can view the first portion 310a, but the second portion 310b is positioned away from the user's viewable area such that the user 314 cannot see the second portion 310b. In this scenario, the first portion 310a may be configured to be input primary and output primary since the user 314 is likely to view and interact with the first portion 310a. Thus, input functionality and/or output functionality of the second portion 310b may be operated under reduced power (e.g., powered off) since the user 314 is unlikely to view or interact with the second portion 310b of the display device 310.

In another implementation, the first portion 310a may be designated as output primary since the first portion 310a is in a position to be viewable by the user 314, whereas the second portion 310b may be designed as input primary to enable the user 314 to provide touch input to the second portion 310b. For instance, the user 314 can provide touch input to the second portion 310b via the user's finger 316, such as tap input, sliding gesture input, and so forth. In one example, the user 314 can slide the finger 316 across the second portion 310b of the display device 310 to cause a corresponding movement of a cursor 318 across the first portion 310a of the display device 310. The user 314 may also tap the finger 316 on the second portion 310b to cause a selection action to occur to select content over which the cursor 318 is positioned.

FIG. 3 also depicts a scenario 300c, which includes a device 320 with a single integrated display 322 that can be bent along the hinge 108. The single integrated display 322 can include multiple display portions, such as display portion 324 and display portion 326, each of which can include touch screen functionality. The display portions 324, 326 can be used to display different content, such as different application user interfaces, or the display portions 324, 326 can be used to display content via a single application user interface across both of the display portions 324, 326. In an example, display portion 326 can be designated as the primary display for presentation of an interactive application (e.g., notetaking application) while the other display portion 324 can be used to display a comparatively-less interactive application, such as a media player application. In another example, both display portions 324, 326 can be designated as the primary display, such as for playback of video content across both of the display portions 324, 326. Alternatively, a single application user interface displayed across both of the display portions 324, 326 can present user interface controls via a designated primary display, which may correspond to the user's handedness, e.g., right/left hand.

Figure 4:
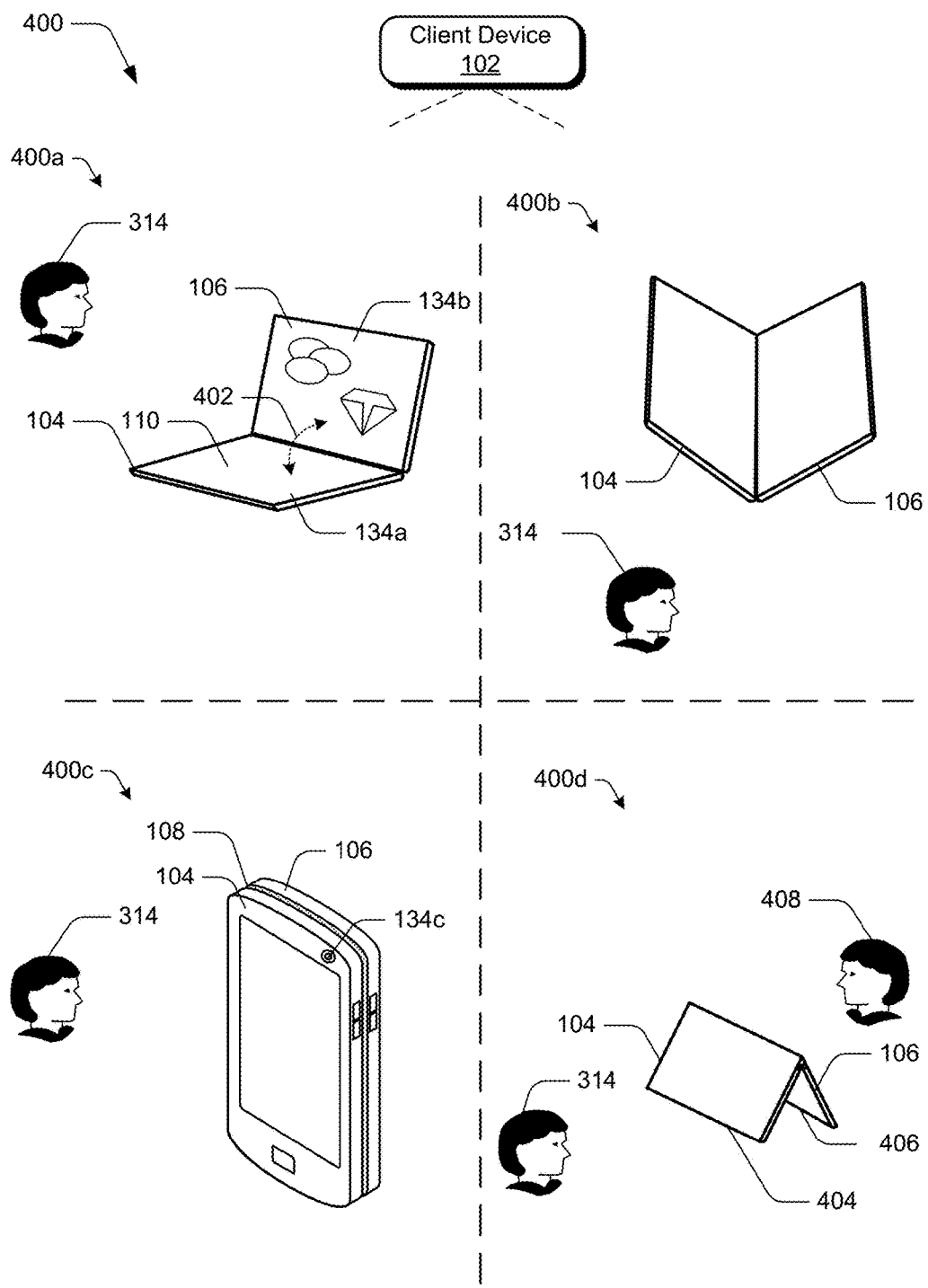
FIG. 4 depicts example implementation scenarios for postures of a hinged device in accordance with one or more implementations.

FIG. 4 illustrates example implementation scenarios 400 for postures of a hinged device in accordance with one or more implementations. The scenarios 400 each include an instance of the client device 102 from FIG. 1 positioned in a different particular posture (e.g., position and orientation in space). For example, a scenario 400a represents a "laptop" posture in which the display device 104 is resting on a surface and facing a direction opposite the surface. For instance, the client device 102 may be resting on a table, a desk, a user's lap, or any other suitable surface. Further, the display device 106 is facing toward the user 314. In the scenario 400a, a hinge angle 402 is formed between the display device 104 and the display device 106, such as between 60 and 160 degrees.

Further to the scenario 400a, the state module 136 can determine, based on various criteria, which of the display devices 104, 106 is to be input primary, and which is to be output primary. For instance, the state module 136 can determine that based on the display device 104 being positioned on a surface and the display device 106 being positioned at a viewing angle, the display device 106 is to be output primary, and the display device 104 is to be input primary. Thus, the display device 106 can be optimized for output, such as by increasing a display resolution and/or display brightness in comparison to the display device 104. Alternatively or additionally, a display resolution and/or brightness of the display device 104 can be reduced relative to the display device 106.

For example, consider that the touch surface 110 of the display device 104 is utilized as an input surface, such as for receiving touch input. A virtual keyboard, for instance, can be displayed on the touch surface 110 to enable a user to enter text and other characters for display on the display device 106. Alternatively or additionally, the touch surface 110 can receive touch gestures to manipulate visual objects displayed on the display device 106. Accordingly, display characteristics of the display device 104 (e.g., resolution, brightness, and so forth) can be turned down since output performance is not a high priority in an input primary scenario. In one example, visual output of the display device 104 may be turned off in the scenario 400a since the display device 106 is designated as output primary. Even though visual output of the display device 104 may be turned off, the touch surface 110 may remain active to receive touch input, such as to enable the touch surface 110 to act as a touchpad for manipulating (e.g., moving and/or selecting) objects displayed on the display device 106.

As part of differentiating between input and output primary, different sensors 134 positioned on the display device 104 and the display device 106 may be operationally configured in different ways. For instance, sensors 134*a* positioned on the display device 104 (e.g., the touch surface 110) can be optimized for input, such as by turning up sensor sensitivity, sensor polling rate, and so forth. Further, since input to the touch surface 112 of the display device 106 is less likely as compared to the touch surface 110, sensors 134*b* positioned on the display device 106 can be turned down. For instance, sensor sensitivity and/or polling rate for the sensors 134*b* on the display device 106 can be turned down and/or turned off.

A scenario 400*b* represents the client device 102 in a "book" posture, in which the client device 102 is held similar to a paper book. The state module 136, for instance, detects that the client device 102 is in the book posture, such as based on the sensors 134 detecting an angle between the display devices 104, 106 and an orientation of the display devices 104, 106 relative to gravity. Alternatively or additionally, the state module 136 can detect that the user 314 is holding the client device 102 in the depicted orientation, such as in a book grip posture. Here, one or both of the display devices 104, 106 can be designated as output primary. Further, one or both of the display devices 104, 106 can be designated as input secondary.

FIG. 4 further depicts a scenario 400*c* in which the client device 102 in a "flipped" posture in which the display devices 104, 106 are facing opposite directions. The hinge 108, for instance, has been bent to "flip" the display device 106 around behind the display device 104. In this scenario 400*c*, the display device 104 is viewable by the user 314, but the display device 106 is not viewable by the user because the display device 106 faces away from the user. The state module 136, for instance, detects via a sensor 134*c* that the user's face is detectable as in a viewing position of the display device 104, but is not detectable in a viewing position of the display device 106.

Accordingly, the display device 104 is designated as output primary and input primary. In at least one implementation, the display device 106 is designated as output secondary and input secondary. The display device 106, for instance, may be placed in a low power state or turned off. The touch surface 112, however, may remain active such that the user 314 can provide touch input to the touch surface 112 while viewing output from the display device 104.

In at least one implementation, optical sensors 134 of the display device 104 can be optimized to receive visual input, such as by turning up sensor sensitivity and/or polling rate. Examples of visual sensors include a camera, a photoelectric sensor, a laser, and so forth. Further, since the display device 106 is positioned out of view of the user 314, optical sensors 134 of the display device 106 can be turned down and/or turned off.

A scenario 400*d* represents a "tent" posture in which the client device 102 is placed in a landscape orientation with the display devices 104, 106 facing outward. An outer edge 404 of the display device 104 and an outer edge 406 of the display device 106, for instance, are placed on an adjacent surface such as a desk or a table. Here, the client device 102 is positioned to allow each of the display devices 104, 106 to be viewed by different users. For example, the user 314 may view the display device 104 and a different user 408 (e.g., sitting across from the user 314) may view the display device 106. Accordingly, the tent posture can allow different experiences to be presented on the display devices 104, 106, respectively.

In at least one implementation, one of the display devices 104, 106 can be designated as input primary and another of the display devices 104, 106 can be designated as output primary. For instance, differentiation between input primary and output primary for the display devices 104, 106 can be based on differing roles for the users 314, 408. Consider, for instance, that the state module 136 detects that the user 314 is in a viewing position for the display device 104, such as using face detection or other user identification technique. Further, the user 314 is identified as a primary user of the client device 102, such as based on a user profile for the user 314. Accordingly, the state module 136 can designate the display device 104 as input and output primary, but can designate the display device 106 as output primary and input secondary. This supports a scenario where the user 314 can provide input to the touch surface 110 to select and manipulate content for display on the display device 106. In one implementation, the display device 104 can be designated as output secondary and the display device 106 designated as output primary, such as to prioritize visual output to the user 408 for content selected and/or generated by the user 314 via interaction with the touch surface 110.

Figure 5:
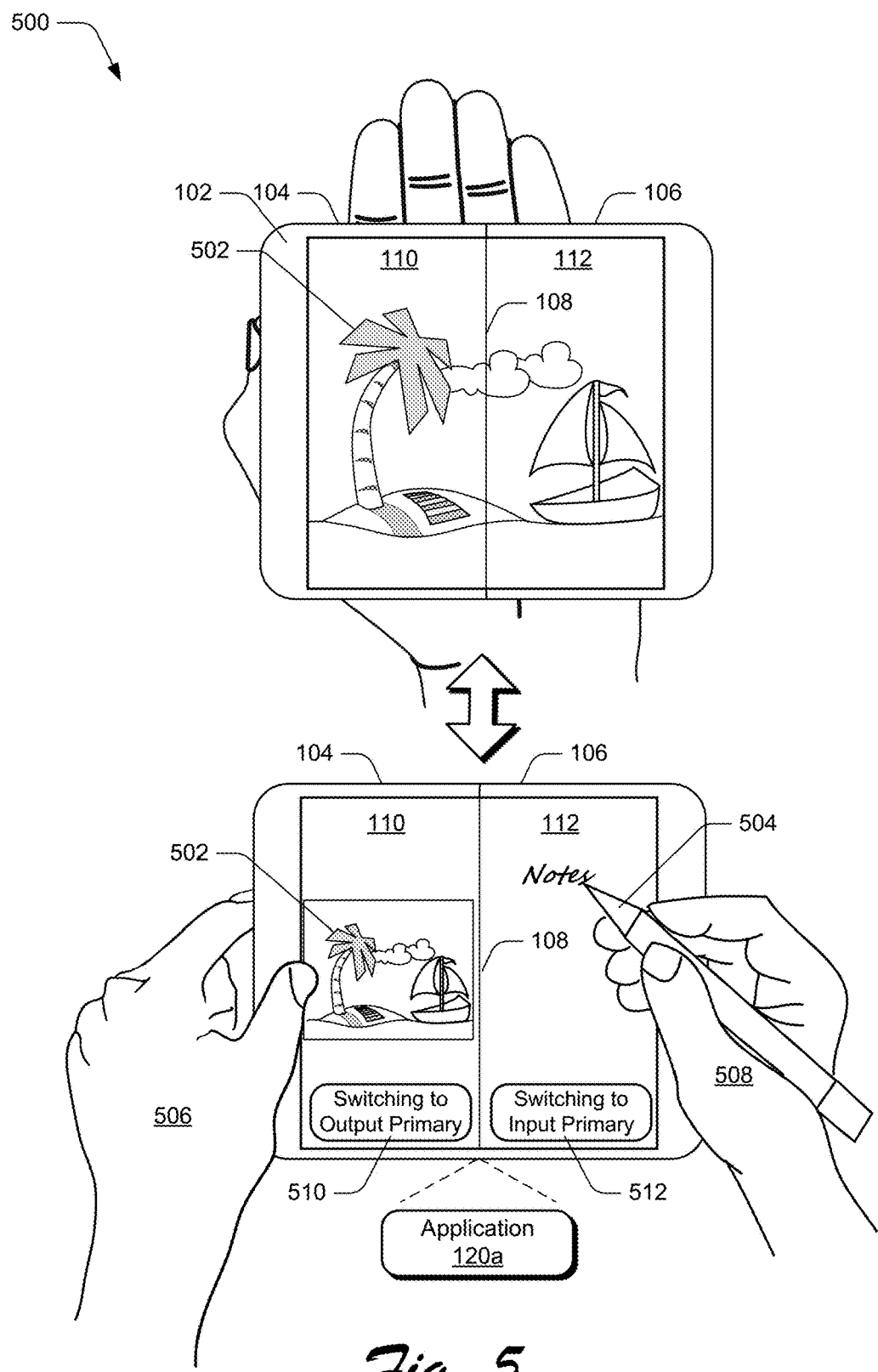
FIG. 5 depicts an example implementation scenario for configuration of primary and secondary displays in accordance with one or more implementations.

FIG. 5 depicts an example implementation scenario 500 for configuration of primary and secondary displays in accordance with one or more implementations. In the scenario 500, the client device 102 is positioned with the display devices 104, 106 side by side such that the touch surfaces 110, 112 together form an approximately planar surface. A hinge angle of the hinge 108, for instance, is approximately 180 degrees, +/−10 degrees.

The upper portion of the scenario 500 depicts the display devices 104, 106 displaying content 502 via both of the display devices 104, 106. The display devices 104, 106, for instance, are both designated as output primary displays and input secondary displays. Generally, this can occur when a user selects to view content across both of the display devices 104, 106. The user, for instance, initiates a full screen viewing of the content 502 across the display devices 104, 106. The content 502 can represent various types of visual content, such as a still image, video, animation, and so forth.

Proceeding to the lower portion of the scenario 500 and without changing a posture of the client device 102 (e.g., the orientation of the display devices 104, 106 relative to one another), the user launches a notetaking application 120*a* on the client device 102. Generally, the notetaking application 120*a* can be launched in various ways. The user, for instance, brings a pen 504 in proximity to and/or in contact with the touch surface 112, and the operating system 118 interprets this as a request to launch the notetaking application 120*a*. Based on a sensor signal and/or context information, the state module 136 can infer that the display device 106 is intended by the user to be used as a primary input surface for the notetaking application 120*a*. For example, the pen 504 in proximity to the touch surface 112 is interpreted as an intent to use the display device 106 as an input primary display device. Alternatively or additionally, the application 120*a* can be identified as being an input primary and/or output secondary application.

As another example, by detecting the user's left hand 506 grasping the client device 102, the system can identify the user, based on hand size and/or shape, and can determine that the user is right handed based on known attributes of the user obtained via the user settings 226, the behavioral data 222, or both. Alternatively or in addition, because the user is grasping the client device 102 with the left hand 506, the system can infer that the user is intending to write notes with a right hand 508 because generally users do not grasp the client device 102 with a dominant writing hand. In addition to knowing that the user is right handed, the system can use the behavioral data to determine that the user has a history of using the notetaking application 120a and/or similar types of applications (e.g., based on classification, user interface controls, functionalities, and/or content of the applications) via display device 106. This may be because the user can write with the right hand without obscuring the display device 104.

Accordingly, the client device 102 can utilize information for the sensors 134 and/or context information 214 to infer that the input primary display is the display device 106, and the output primary display is the display 104. Using this information, the client device 102 can then move and resize the display of the content 502 to display the content 502 only via the display device 104, and launch the notetaking application 120a via the inferred input primary display, e.g., the display device 106.

In at least one implementation, the display device 104 is designated as both output primary and input secondary. For instance, since the user is providing input to the display device 106 and gripping the client device 102 via the display device 104, the state module 136 can infer that the user is less likely to provide input to the display device 104. Accordingly, the state module 136 can configure the display device 104 as input secondary, attributes of which are discussed throughout this disclosure. Further, the display device 106 can be designated as both input primary and output secondary. Since the user is writing notes on the display device 106 (e.g., via digital ink), output properties of the display device 106 (e.g., resolution, brightness, and so forth) may be considered less important, and thus these properties can be turned down to conserve battery life.

Further, and as a consequence of the differentiation between different usage scenarios of the display devices 104, 106, sensors on the respective display devices 104, 106 can be configured in different ways. For instance, the display device 106 can be designated as sensor primary to enable different user interactions with the display device 106 to be more accurately captured and interpreted. Further, the display device 104 can be designated as sensor secondary since the user is viewing the content 504 displayed on the display device 104 and is less likely to provide input to the display device 104 than to the display device 106. Different configuration attributes of sensor primary and sensor secondary display devices are discussed throughout this disclosure.

Accordingly, any of a variety of different postures can be utilized to configure connected display devices as either output primary or output secondary, and/or input primary or input secondary. Further, a change from one posture to another posture can trigger a change in designation as output primary and/or input primary. For example, a change in the hinge angle of the hinge 108 between the display devices 104, 106 can trigger a change in the primary display if the change in the hinge angle is greater than a threshold value, e.g., 10 degrees, 15 degrees, 30 degrees, and so on. Any suitable threshold value can be utilized for the change in the hinge angle to trigger a change in an input primary and/or output primary display. In implementations, a physical displacement, rather than a hinge angle change, can trigger a change in the primary display. For example, with reference to FIG. 4, the physical displacement can include a posture change from the laptop posture in scenario 400a to the book posture in the scenario 400b, where the hinge angle remains substantially the same but the orientation of the client device 102 is rotated from a landscape orientation to a portrait orientation. Techniques described herein, for example, can infer a user's intended primary output display and/or input display based on physical movement (e.g., physical displacement, change in the hinge angle) of the client device 102 in order to automatically present the content to the user in the manner desired by the user.

As an alternative or addition to the above considerations, a change in how a user grips the client device 102 can be used to assign or reassign a display device as output primary and/or input primary. For instance, with reference to the scenario 500, consider that the user changes from gripping the client device 102 as depicted in the lower portion of the scenario 500 (i.e., via a side of the client device 102), to resting the client device 102 in a palm of the user's hand as depicted in the upper portion of the scenario 500. Generally, this mimics a user holding a book in their hand. Accordingly, the state module 136 can detect this change in device grip posture, and can cause a change in output primary and/or input primary designation for the display devices 104, 106. For instance, based on the change in grip position, the state module 136 can infer that the user intends to view the content 502 across both of the display devices 104, 106. Accordingly, both of the display devices 104, 106 can be designated as output primary displays. Further, the content 502 that was displayed only on the display device 104 (such as in the lower portion of the scenario 500) can be resized and repositioned to be displayed across both of the display devices 104, 106, such as depicted in the upper portion of the scenario 500.

In at least one implementation, an indication of which display is to be designated as output primary and/or input primary can be provided to the user. For instance, in the scenario 500 and in response to switching the display device 104 to output primary and the display device 106 to input primary, an output primary notification 510 is presented in the display device 104, and an input primary notification 512 is presented on the display device 106. Generally, the output primary notification 510 represents a visual notification that the display device 104 is switching to output primary. Further, the input primary notification represents a visual notification that the display device 106 is switching to input primary. In this way, the user can be informed of which display device will be configured as output primary, and which display device will be configured as input primary.

According to one or more implementations, a user-selectable option to override the determination of which display device is to be the input primary and/or output primary is provided. The user, for instance, can select the output primary notification 510 to prevent switching the display device 104 to an output primary mode. Further, selecting the input primary notification 512 can prevent switching the display device 106 to an input primary mode. In one example implementation, selecting either the output primary notification 510 or the input primary notification 512 causes both of the display devices 104, 106 to operate in a standard input/output mode such that neither display device is configured as output primary or input primary.

Techniques described herein can be leveraged to interpret user actions overriding decisions concerning output primary and input primary displays to inform future decisions whether to switch a display device to output primary and/or input primary. For instance, based on an explicit override input by the user (e.g., via selection of the output primary notification 510 and/or the input primary notification 512), the verification module 140 can update weightings used by the inference module 138 to improve future decisions whether to switch a display device to input primary and/or output primary.

While implementations are discussed herein within the context of a multi-screen device, it is to be appreciated that techniques for configuration of primary and secondary displays may be employed in the context of a single screen device. Consider, for example, the following scenario.

Figure 6:
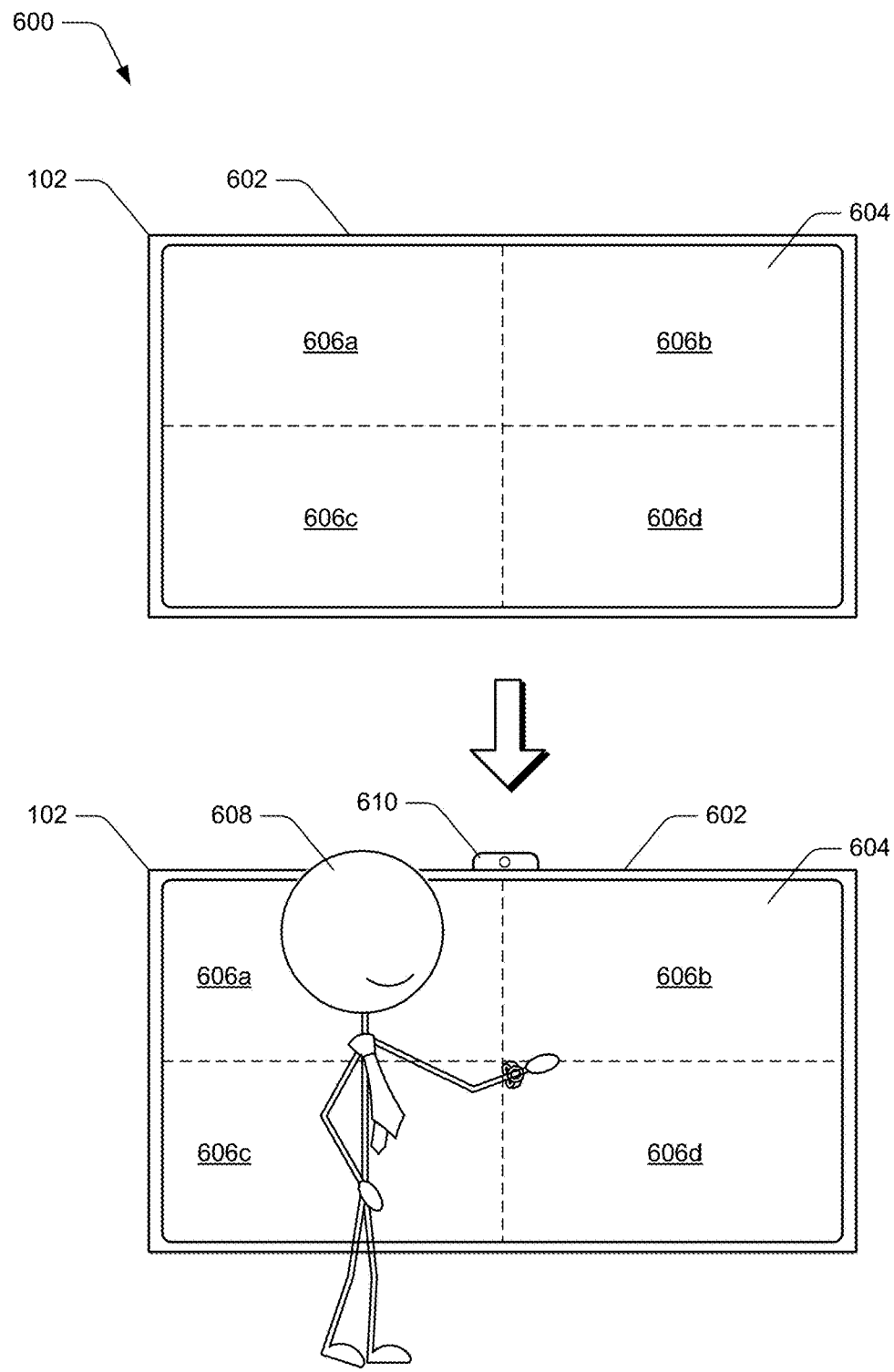
FIG. 6 depicts an example implementation scenario in which different zones of a display device can be configured in different ways in accordance with one or more implementations.

FIG. 6 depicts an implementation scenario 600 in which different zones of a display device can be configured in different ways. The scenario 600 includes an instance of the client device 102 including a display device 602 with a display surface 604. In at least one implementation, this instance of the client device 102 represents an interactive device such as a meeting room device configured to enable users to view and interact with the client device 102 as part of an interactive session, such as a multi-person meeting. The display 602, for instance, is a large-screen display and the display surface 604 supports touch input to manipulate content displayed on the display surface 604.

According to various implementations, the display surface 604 is divided into different zones that are independently controllable to adjust output properties and input properties of the zones. In this particular example, the display surface 604 includes a zone 606a, a zone 606b, a zone 606c, and a zone 606d. This particular arrangement of zones is presented for purpose of example only, and another instance of the display device 602 can include any shape, size, and/or arrangement of zones within the scope of the claimed implementations. Further, the dashed lines are included for purposes of this discussion to generally represent a separation between zones, and are not intended to represent elements that are visible in a typical usage of the client device 102.

Generally, each of the zones 606a-606d is independently controllable to enable each zone to be designated as input primary and/or output primary. For instance, based on a particular detected condition, one of the zones 606a-606d can be designated as input primary, and another of the zones 606a-606d can be designated as output primary.

In one example, user proximity and/or interaction with the display surface 604 causes a configuration of one or more of the zones 606a-606d as input primary and/or output primary. For instance, and proceeding to the lower portion of the scenario 600, consider that a user 608 approaches the display device 602. The client device 102 detects the proximity and position of the user 608. In this particular example, the client device 102 includes a position sensing device 610, e.g., a camera. Alternatively or additionally, proximity and position of the user 608 can be detected in other ways, such as based on user contact with the display surface 604. Generally, the position sensing device 610 can detect a proximity and position of the user 608 relative to the display surface 604.

Further to the scenario 600, the state module 136 ascertains (e.g., leveraging the position sensing device 610) that the user 608 is positioned in front of the zones 606a, 606c and is thus closer in proximity to the zones 606a, 606c than to the zones 606b, 606d. Accordingly, the state module 136 designates the zones 606b, 606d as output primary, and the zones 606a, 606c as output secondary. For instance, since content displayed within the zones 606a, 606c is likely at least partially obscured by the user 608, the state module 136 can infer that content displayed within the zones 606b, 606d is likely higher priority content for output. Thus the zones 606b, 606d can be configured (e.g., optimized) for visual output. Different ways of configuring a display and/or portions of a display as output primary are discussed throughout, and include operations such as maintaining, for the output primary zones, a higher display brightness and/or resolution than for other non-output primary zones.

In at least one implementation, the zones 606b, 606d can also be designated as input primary since the user 608 is more likely to interact with content presented within the zones 606b, 606d. The zones 606a, 606c may also be designated as input secondary since the user 608 is less likely to interact with these zones based on the current location of the user.

According to techniques for configuration of primary and secondary displays described herein, designation of input/output primary portions of the display surface 604 can change dynamically, such as based on a change in the user 608's position. For instance, consider that the user 608 wishes to interact with content displayed in the zones 606a, 606c, and to enable other users to view this content. Accordingly, the user moves to the right in front of the zones 606b, 606d. Accordingly, the state module 136 detects the change in position, such as via position data received from the position sensing device 610. Since the user 608 is now positioned in front of the zones 606b, 606d, the zones 606a, 606c are reconfigured as output primary and input primary. Further, the zones 606b, 606d are reconfigured as output secondary and input secondary. Thus, techniques described herein can dynamically adapt to various state changes for controlling input and output mode designations.

Having described some example implementation scenarios, consider now some example procedures for configuration of primary and secondary displays in accordance with one or more implementations.

Example Procedures

The following discussion describes example procedures for configuration of primary and secondary displays in accordance with one or more implementations. The example procedures may be employed in the environment 100 of FIG. 1, the system 1000 of FIG. 10, and/or any other suitable environment. The procedures, for instance, represent procedures for implementing the example implementation scenarios discussed above. In at least some implementations, the steps described for the various procedures can be implemented automatically and independent of user interaction, such as by the state module 136. Further, the steps described in the procedures below can be performed in any suitable combination and/or order, and are not intended to be construed as limited to the orders described.

Figure 7:
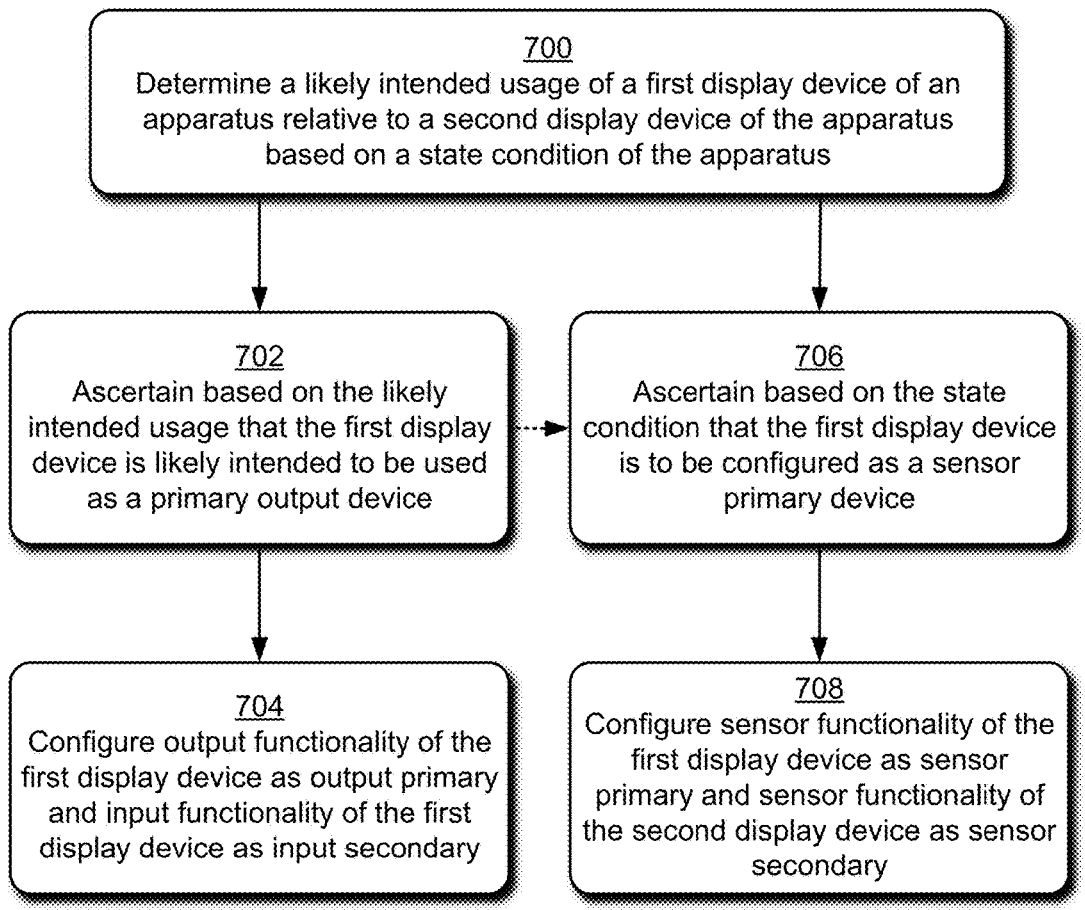
FIG. 7 is a flow diagram that describes steps in a method for configuring a display device based on a likely intended usage of the display device in accordance with one or more implementations.

FIG. 7 is a flow diagram that describes steps in a method in accordance with one or more implementations. The method, for instance, describes an example procedure for configuring a display device based on a likely intended usage of the display device.

Step 700 determines a likely intended usage of a first display device of an apparatus relative to a second display device of the apparatus based on a state condition of the apparatus. Examples of different state conditions are discussed above, and include:

Display device angle—an angle of the first display device relative to the second display device. This angle can be determined in various ways, such as based on relative angle between respective display surfaces of the respective display devices, rotation angle of a hinge that connects the display devices, comparative angles of the display devices relative to a gravitational vector, and so forth.

Application state—an identity and/or type of application that is launched on the apparatus, such as on a particular display device. The application, for instance, may be characterized as being input primary or output primary, such as based on an experience provided by the application. For example, a video player application can be characterized as output primary since its primary function is to output content. A notetaking application, however, can be characterized as input primary, since its primary function is to receive user input of notes and other annotations.

Grip posture—a way in which is a user is gripping the apparatus. A grip, for instance, represents a user grasping the apparatus at a particular region, and/or resting the apparatus in the user's hand. Generally, certain grips such as grasping the apparatus on both sides using two hands can be designated as output primary. Other grips, such as grasping the apparatus only on one side can be designated as input primary.

User profile—a behavior profile for a user that is interacting with the apparatus. The profile, for instance, can indicate past user behavior in certain contexts, such as whether a user interacts with a particular experience primarily for output or primarily for input. For example, consider a scenario where two applications are open, a first application on the first display device and a second application on the second display device. If a user typically provides less input (e.g., no input) to the first application than to the second application, then the first display device can be designated as output primary, and the second display device as input primary.

As another example, known physical and behavioral traits of a user can be used to infer output primary and input primary displays. For instance, if a user is known to be left handed, then a display device oriented on the left side of an apparatus can be designated as input primary, and a display device oriented to the right as output primary.

In a further example, a user can expressly identify which display device is to be output primary, and which display device is to be input primary. In this case, a device state context in which the user selects the output primary and input primary displays can be saved and used as part of a subsequent decision regarding output and input primary displays. Different examples of device state are discussed above, such as applications that are open on different display devices.

Other examples of state conditions are contemplated, such as discussed above with reference to the context information 214. Accordingly, any one or combination of the different state conditions described herein can be employed to determine which display to designate as output primary, and which display to designate as input primary.

Step 702 ascertains based on the likely intended usage that the first display device is likely intended to be used as a primary output device. The determined likely intended usage, for instance, indicates that a user is likely to utilize the first display predominantly for output purposes. Alternatively or additionally, the likely intended usage indicates that the user is likely to utilize the second display device predominantly for input purposes.

Step 704 configures output functionality of the first display device as output primary and input functionality of the first display device as input secondary. Configuring output functionality of a display device as output primary can include one or more of a number of different output device configurations, such as:

Display resolution—display resolution of an output primary display device can be maintained at a higher resolution than another display that is not an output primary display.

Display Brightness—brightness of an output primary display device can be maintained at a higher brightness value than another display that is not an output primary display.

Refresh Rate—a refresh rate of an output primary display can be configured to be higher than a non-output primary display.

Color Gamut—an available color gamut for an output primary display can include a greater number of color options than an available color gamut for a non-output primary display.

These example configurations for an output primary display are presented for purpose of example only, and it is to be appreciated that an output primary display can be configured in a variety of different ways not expressly mentioned herein.

Configuring input functionality of a display device as input secondary can include one or more of a number of different input device configurations, such as:

Input device sensitivity—sensitivity of an input secondary device can be maintained at a lower level than an input primary device. For instance, voltage level of a touch sensitive input device (e.g., a capacitive sensor) can be decreased as compared to an input primary device.

Input device sampling rate—a sampling rate for an input secondary device can be maintained at a lower rate than an input primary device.

Input device availability—in a scenario where an input secondary device includes multiple different input devices, one or more input devices can be deactivated. For instance, consider that an input secondary device includes multiple touch-sensitive input devices, such as a grip sensor in a bezel, and a separate touchscreen. The grip sensor can be turned down and/or deactivated in the input secondary mode.

These examples of input secondary configurations are presented for purposes of example only, and it is to be appreciated that configuring a display device as input secondary generally causes power allocated to the display device to be reduced as compared to an input primary device.

According to one or more implementations, configuring display devices as either sensor primary or sensor secondary can be performed concurrently, in parallel with, or alternatively to configuring display devices as input/output primary, or input/output secondary. For instance, the following steps depicted in FIG. 7 can be performed concurrently, in parallel with, or alternatively to the steps described above.

Step 706 ascertains based on the state condition that the first display device is to be configured as a sensor primary device. Examples of different state conditions are discussed above. For instance, a state condition that is considered to determine whether a display device is to be output primary or output secondary may additionally or alternatively be considered to determine whether the display device is to be sensor primary or sensor secondary.

In one or more implementations, designating a display device as sensor primary or sensor secondary may be based on whether the display device is designated as output primary or input primary. With reference to the client device 102, for example, when the display device 104 is designated as output primary, the display device 106 is designated as sensor primary. This contemplates a scenario where the user is viewing content via the display device 104, and is interacting with (e.g., providing input to) the display device

106 such that greater sensor sensitivity is provided to the display device 106 than to the display device 104. In an alternative implementation, a display device that is designated as output primary can also be designated as sensor primary. For instance, when an output primary device is leveraged to display interactive content configured to receive user input, the output primary device may also be designated as sensor primary to provide fast and accurate interpretation and response to user input to the output primary device.

Step 708 configures sensor functionality of the first display device as sensor primary and sensor functionality of the second display device as sensor secondary.

Configuring sensor functionality of a display device as sensor primary or sensor secondary can include one or more of a number of different sensor configurations, such as:

Sensor sensitivity—sensitivity of a sensor on a sensor primary device can be maintained at a higher level than a sensor on a sensor secondary device. For instance, voltage level of a touch sensitive input device (e.g., a capacitive sensor) can be maintained at a higher level as compared to a sensor secondary device.

Sensor sampling rate—a sensor sampling rate for sensor primary device can be maintained at a higher rate than a sensor secondary device.

Sensor batching—sensor data from a sensor secondary device can be batched over a period of time instead of providing the sensor data at smaller time intervals. For instance, sensor data from a sensor of a sensor secondary device can be batched between sampling periods and provided in response to a request for sensor data from the sensor.

Sensor availability—in a scenario where a sensor secondary device includes multiple different sensors, one or more input devices can be deactivated. For instance, consider that a sensor secondary device includes multiple light sensors, such as a camera and a separate photoelectric sensor. The camera can be turned down and/or deactivated in the sensor secondary mode, such as to preserve battery life.

These examples of sensor primary/secondary configurations are presented for purposes of example only, and it is to be appreciated that configuring a display device as sensor secondary generally causes power allocated to sensor functionality of the display device to be reduced as compared to a sensor primary device.

Figure 8:
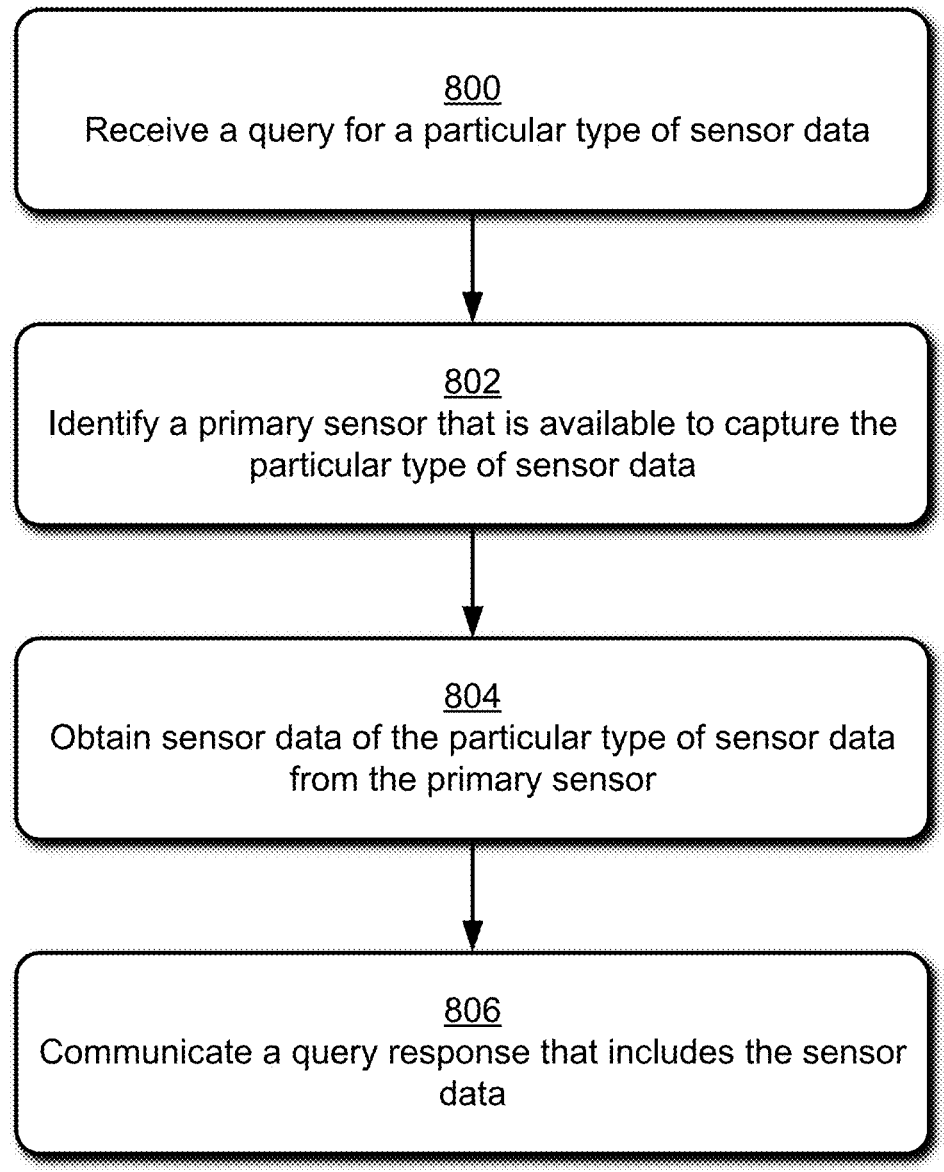
FIG. 8 is a flow diagram that describes steps in a method for returning sensor data based on a primary sensor configuration in accordance with one or more implementations.

FIG. 8 is a flow diagram that describes steps in a method in accordance with one or more implementations. The method, for instance, describes an example procedure for returning sensor data based on a primary sensor configuration.

Step 800 receives a query for a particular type of sensor data. The operating system 118, for instance, receives a request from an application 120 for a particular type of sensor data. Examples of different types of sensor data include touch sensor data, light sensor data (e.g., from a photodetector), image and/or video data (e.g., from a camera), sound sensor data, grip sensor data (which may be a type of touch data), and so forth. In at least one implementation, the request identifies the particular type of sensor data without identifying a specific sensor or sensor type to be used to retrieve the sensor data. For example, the request may request an "image capture" from the client device 102 without identifying an instance of a sensor to be used to capture the image, or identifying a sensor type (e.g., "camera") to be used to capture the image. Alternatively, the request may request that a discrete instance of a sensor be used to capture the sensor data, and/or a specific type of sensor to be used to capture the sensor data.

Step 802 identifies a primary sensor that is available to capture the particular type of sensor data. The operating system 118, for instance, identifies which sensor is identified as being a primary sensor for providing the particular type of sensor data. In at least one implementation, a sensor that resides on a sensor primary display device and that is capable of providing the particular type of sensor data is designated as a primary sensor for the particular type of sensor data. The state module 136 may track which sensors 134 are primary sensors for different particular types of sensor data, and may provide this information to a requesting entity such as the operating system 118 and/or an application 120. Generally, multiple different sensors may reside on the client device 102 that are configured to provide the particular type of sensor data, and a primary sensor may be designated from among these different sensors based on different criteria, such as based on the sensor residing on a sensor primary display device.

Step 804 obtains sensor data of the particular type of sensor data from the primary sensor. For instance, the operating system 118 interfaces with the primary sensor to obtain sensor data of the particular type. This may be performed in various ways, such as by interfacing directly with primary sensor hardware, and/or interfacing with a sensor driver or other sensor management functionality.

Step 806 communicates a query response that includes the sensor data. The operating system 118, for example, communicates the sensor data to a requesting entity, such as an application 120. In at least one implementation, the sensor data does not identify a specific sensor from which the sensor data was obtained, e.g., the primary sensor for the requested type of sensor data.

Additionally or alternatively to communicating a query response including the sensor data, the primary sensor may be identified to the requesting entity to enable the entity to obtain sensor data directly from the primary sensor. For instance, the operating system 118 can identify the primary sensor to a requesting application 120, and the application 120 can obtain the sensor data directly from the primary sensor.

As mentioned above, in at least one scenario a request for sensor data may identify a particular sensor and/or sensor type to be used to obtain the sensor data. If the sensor/sensor type identified in the request is different than the identified primary sensor, the primary sensor may be used to obtain the sensor data thus overriding the requested sensor/sensor type. This enables the system to adapt to dynamic changes in sensor configuration and thus provide more reliable sensor data, such as when a requested sensor/sensor type is unavailable or is functionally impaired by a current device state.

While the procedures described above are discussed with reference to multi-display device scenarios, implementations for configuration of primary and secondary displays described herein may also be employed to configure operation of a single screen. Consider, for instance, the following example procedure.

Figure 9:
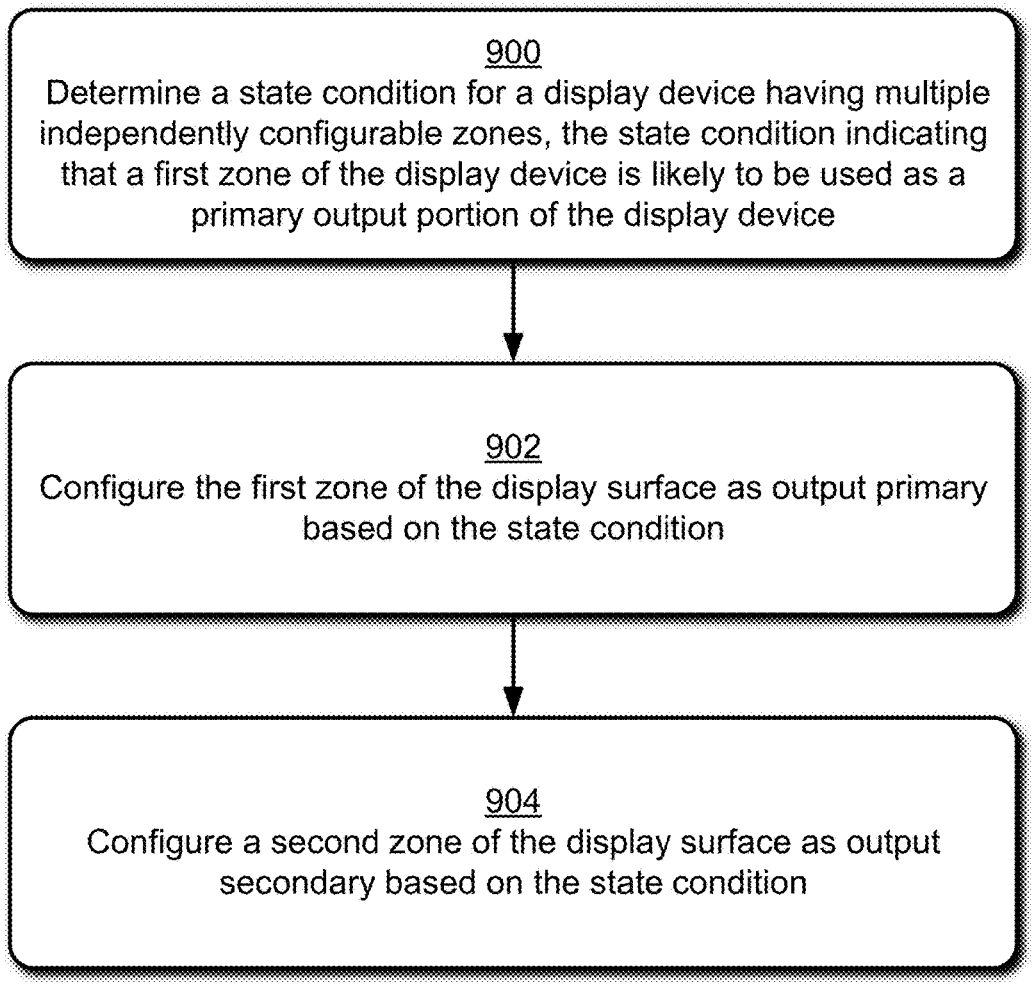
FIG. 9 is a flow diagram that describes steps in a method for configuring different zones of a display device in accordance with one or more implementations.

FIG. 9 is a flow diagram that describes steps in a method in accordance with one or more implementations. The method, for instance, describes an example procedure for configuring different zones of a display device.

Step 900 determines a state condition for a display device having multiple independently configurable zones, the state condition indicating that a first zone of the display device is likely to be used as a primary output portion of the display device. Examples of different state conditions that can be used to designate an output primary display and/or portion of a display are discussed above, such as user proximity to a different portion of the display, a particular application displayed on the first zone, user input to identify the first zone as output primary, and so forth.

Step 902 configures the first zone of the display surface as output primary based on the state condition. Different ways of configuring a display and/or portions of a display for output primary are discussed above, such as maintaining a higher display resolution and/or brightness for the output primary zone(s) than for non-output primary zone(s). In at least one implementation, the first zone can also be configured as input primary.

Step 904 configures a second zone of the display surface as output secondary based on the state condition. Display characteristics of the second zone, for instance, are configured to deemphasize output at the second zone. Different ways of configuring a display and/or portions of a display as output secondary are discussed above, such as maintaining a lower display resolution and/or brightness for the output primary zone(s) than for output primary zone(s). In at least one implementation, the second zone can also be configured as input secondary.

Accordingly, techniques described herein provide more efficient control of display devices of a hinged device and improve the user experience by optimizing output and input characteristics of the display devices based on different usage scenarios. Further, by reducing power utilized by input devices, output devices, and sensors that are designated as secondary (e.g., not primary), implementations reduce power consumption, thus conserving power and battery life of a client device.

Having described some example implementation details, consider now a discussion of an example system and device in accordance with one or more implementations.

Example System and Device

Figure 10:
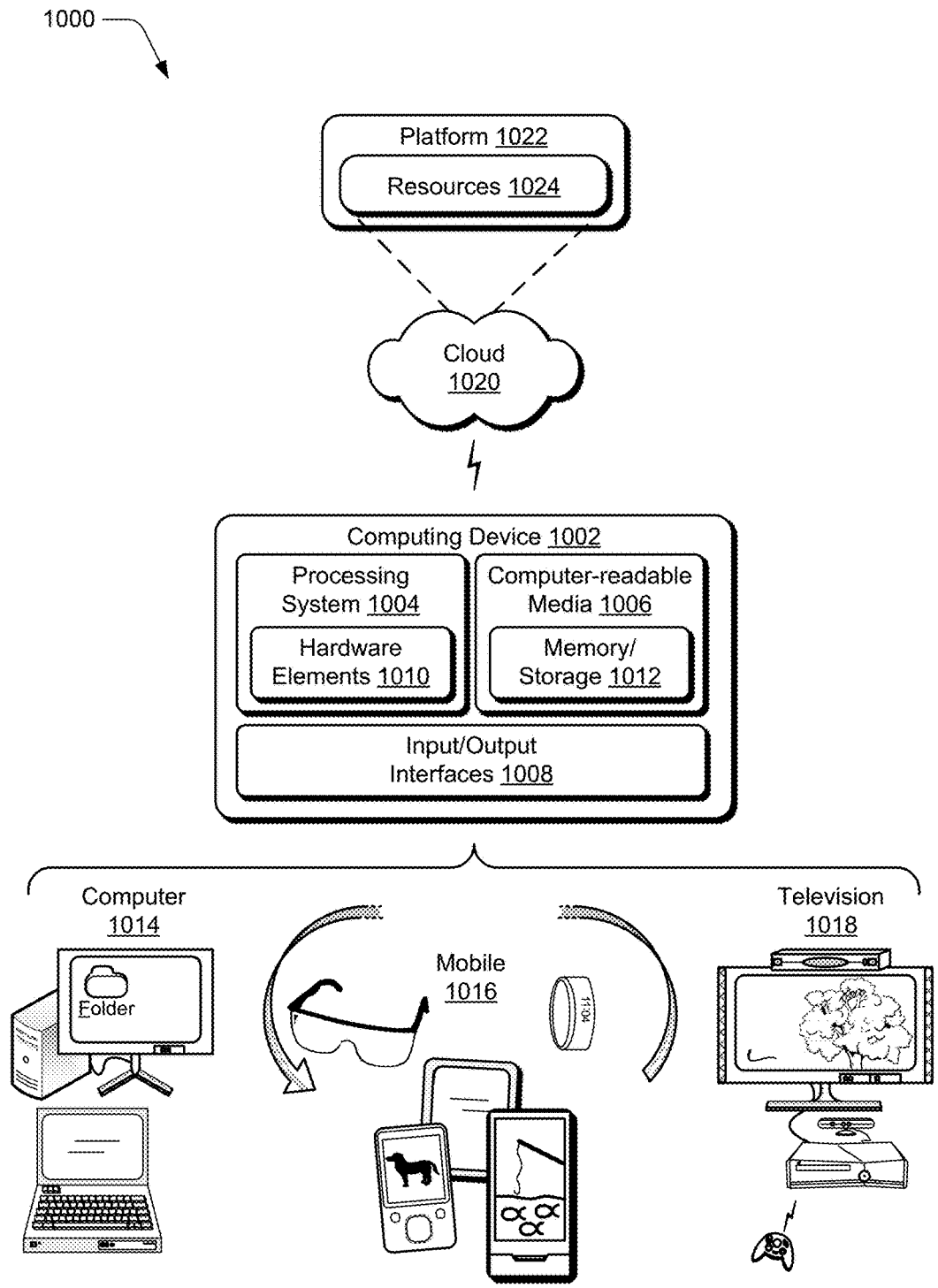
FIG. 10 illustrates an example system including various components of an example device that can be implemented as any type of computing device as described with reference to FIGS. 1-9 to implement techniques described herein.

FIG. 10 illustrates an example system generally at 1000 that includes an example computing device 1002 that is representative of one or more computing systems and/or devices that may implement various techniques described herein. For example, the client device 102 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more Input/Output (I/O) Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), motion functionality (e.g., accelerometers or other sensors that are configured to detect physical motion), a camera (e.g., which may employ visible or non-visible wavelengths such as infrared frequencies to detect movement that does not involve touch as gestures), six degrees of freedom controllers such as used in virtual reality and augmented reality technologies, and so forth. Examples of output devices include a display device (e.g., a monitor or projector), speakers, a printer, a network card, tactile-response device, head mounted displays (e.g., for virtual reality and augmented reality applications), and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1010 and computer-readable media 1006 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules that are executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a wearable device (e.g., a watch, glasses, an article of clothing, etc.), a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client device 102 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device implementation, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for configuring a display device as output primary, the system comprising: an apparatus having a first display device and a second display device physically connected to each other and hingeably moveable relative to each other about a hinge portion; at least one processor; and at least one computer-readable storage media storing instructions that are executable by the at least one processor to perform operations including: determining a likely intended usage of the first display device relative to the second display device based on a state condition of the apparatus; ascertaining based on the likely intended usage that the first display device is likely intended to be used as a primary output device; and configuring output functionality of the first display device as output primary and input functionality of the first display device as input secondary.

In addition to any of the above described systems, any one or combination of: wherein the state condition comprises a change in angle of the first display device relative to the second display device; wherein the state condition comprises one or more of an application launched on the first display device, or an application launched on the second display device; wherein the state condition comprises detecting a change in user interaction with one or more of the first display device or the second display device; wherein the state condition comprises detecting a grip position of a user grasping the apparatus; wherein said configuring output functionality of the first display as output primary comprises maintaining one or more of a higher display resolution for the first display device than for the second display device, or a higher display brightness for the first display device than for the second display device; wherein said configuring input functionality of the first display as input secondary comprises maintaining a lower sensor sensitivity for the first display device than for the second display device; wherein said configuring input functionality of the first display as input secondary comprises implementing a lower sensor sampling rate for the first display device than for the second display device; wherein the operations further include configuring output functionality of the second display device as output secondary and input functionality of the second display device as input primary, said configuring input functionality of the second display device as input primary comprising maintaining one or more of a higher sensor sensitivity for the second display device than for the first display device, or implementing a higher sensor sampling rate for the second display device than for the first display device; wherein the operations further include presenting a visual notification indicating that the first display device is being configured as output primary, the visual notification being selectable to override the determination to configure the first display device as output primary.

A computer-implemented method for configuring sensor functionality of a display device as sensor primary, the method comprising: determining a likely intended usage of a first display device of an apparatus relative to a second display device of the apparatus based on a state condition of the apparatus; determining based on the state condition that the first display device is to be configured as a sensor primary device; and configuring sensor functionality of the first display device as sensor primary and sensor functionality of the second display device as sensor secondary.

In addition to any of the above described methods, any one or combination of: wherein the state condition comprises one or more of an angle of the first display device relative to the second display device, or user proximity to the first display device; wherein said configuring sensor functionality of the first display device as sensor primary comprises maintaining a higher sensor sensitivity for the first display device than for the second display device; wherein said configuring sensor functionality of the first display device as sensor primary comprises implementing a higher sensor sampling rate for the first display device than for the second display device; further comprising: receiving a query from a requesting functionality for a particular type of sensor data; identifying a primary sensor of the first display device that is available to capture the particular type of sensor data; and enabling sensor data from the primary sensor to be provided to the requesting functionality; further comprising: detecting a change in the state condition of the apparatus indicating a change in the likely intended usage of the first display device relative to the second display device; determining based on the change in the state condition that the second display device is to be configured as the sensor primary device; and configuring sensor functionality of the second display device as sensor primary and sensor functionality of the first display device as sensor secondary.

A system for configuring zones of a display surface, the system comprising: a display device with a display surface having multiple independently configurable zones; at least one processor; and at least one computer-readable storage media storing instructions that are executable by the at least one processor to perform operations including: determining a state condition for the display device indicating that a first zone of the display device is likely to be used as a primary output portion of the display device; configuring the first zone of the display surface as output primary based on the state condition; and configuring a second zone of the display surface as output secondary based on the state condition.

In addition to any of the above described methods, any one or combination of: wherein the state condition comprises an indication that a user is closer in proximity to the first zone than to the second zone; wherein said configuring the first zone of the display surface as output primary comprises maintaining one or more of a higher display resolution or a higher display brightness for the first zone than for the second zone; wherein the operations further include configuring the first zone as input primary, and the second zone as input secondary.

CONCLUSION

Techniques for configuration of primary and secondary displays are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
   an apparatus having a first display device and a second display device physically connected to each other and hingeably moveable relative to each other about a hinge portion;
   at least one processor; and
   at least one computer-readable storage media storing instructions that are executable by the at least one processor to perform operations including:
      determining a likely intended usage of the first display device relative to the second display device based on a state condition of the apparatus;
      ascertaining based on the likely intended usage that the first display device is likely intended to be used as a primary output device;
      configuring output functionality of the first display device as output primary and input functionality of the first display device as input secondary; and
      optimizing sensor functionality of the first display device based on the configuring of the output functionality of the first display device as output primary and the input functionality of the first display device as input secondary.

2. A system as described in claim 1, wherein the state condition comprises a change in angle of the first display device relative to the second display device.

3. A system as described in claim 1, wherein the state condition comprises one or more of an application launched on the first display device, or an application launched on the second display device.

4. A system as described in claim 1, wherein the state condition comprises detecting a change in user interaction with one or more of the first display device or the second display device.

5. A system as described in claim 1, wherein the state condition comprises detecting a grip position of a user grasping the apparatus.

6. A system as described in claim 1, wherein said configuring output functionality of the first display device as output primary comprises maintaining one or more of a higher display resolution for the first display device than for the second display device, or a higher display brightness for the first display device than for the second display device.

7. A system as described in claim 1, wherein said configuring input functionality of the first display device as input secondary comprises maintaining a lower sensor sensitivity for the first display device than for the second display device.

8. A system as described in claim 1, wherein said configuring input functionality of the first display device as input secondary comprises implementing a lower sensor sampling rate for the first display device than for the second display device.

9. A system as described in claim 1, wherein the operations further include configuring output functionality of the second display device as output secondary and input functionality of the second display device as input primary, said configuring input functionality of the second display device as input primary comprising maintaining one or more of a higher sensor sensitivity for the second display device than for the first display device, or implementing a higher sensor sampling rate for the second display device than for the first display device.

10. A system as described in claim 1, wherein the operations further include presenting a visual notification indicating that the first display device is being configured as output primary, the visual notification being selectable to override the determination to configure the first display device as output primary.

11. A system as described in claim 1, wherein said configuring of the first display device further comprises optimizing display settings of the first display device relative to the second display device based on the configuring of the output functionality and the input functionality of the first display device, wherein the optimizing of the display settings comprises one or more selected from a group consisting of: adjusting a display resolution for the first display device so the display resolution of the first display device is higher than a display resolution of the second display device; and adjusting a display brightness for the first display device so the display brightness of the first display device is higher than a display brightness of the second display device.

12. A computer-implemented method, comprising:
   determining a likely intended usage of a first display device of an apparatus relative to a second display device of the apparatus based on a state condition of the apparatus;
   determining based on the state condition that the first display device is to be configured as a sensor primary device;
   configuring sensor functionality of the first display device as sensor primary and sensor functionality of the second display device as sensor secondary; and
   optimizing sensor functionality of the first display device based on the configuring of the output functionality of the first display device as output primary and the input functionality of the first display device as input secondary.

13. A method as described in claim 12, wherein the state condition comprises one or more of an angle of the first display device relative to the second display device, or user proximity to the first display device.

14. A method as described in claim 12, wherein said configuring sensor functionality of the first display device as sensor primary comprises maintaining a higher sensor sensitivity for the first display device than for the second display device.

15. A method as described in claim 12, wherein said configuring sensor functionality of the first display device as sensor primary comprises implementing a higher sensor sampling rate for the first display device than for the second display device.

16. A method as described in claim 12, further comprising:
receiving a query from a requesting functionality for a particular type of sensor data;
identifying a primary sensor of the first display device that is available to capture the particular type of sensor data; and
enabling sensor data from the primary sensor to be provided to the requesting functionality.

17. A method as described in claim 12, further comprising:
detecting a change in the state condition of the apparatus indicating a change in the likely intended usage of the first display device relative to the second display device;
determining based on the change in the state condition that the second display device is to be configured as the sensor primary device; and
configuring sensor functionality of the second display device as sensor primary and sensor functionality of the first display device as sensor secondary.

18. A computer-implemented method as described in claim 12, further comprising: optimizing display settings of the first display device relative to the second display device based on the configuring of the output functionality and the input functionality of the first display device, wherein the optimizing of the display settings comprises one or more selected from a group consisting of: adjusting a display resolution for the first display device so the display resolution of the first display device is higher than a display resolution of the second display device; and adjusting a display brightness for the first display device so the display brightness of the first display device is higher than a display brightness of the second display device.

19. A non-transitory computer-readable medium storing computer executable instructions that, when executed by at least one processor, cause the at least one processor to execute a method comprising:
determining a likely intended usage of a first display device of an apparatus relative to a second display device of the apparatus based on a state condition of the apparatus;
determining based on the state condition that the first display device is to be configured as a sensor primary device;
configuring sensor functionality of the first display device as sensor primary and sensor functionality of the second display device as sensor secondary; and
optimizing the sensor functionality of a sensor for one or more of the first display device and the second display device based on the configuration of the first display device as the sensor primary and the second display device as the sensor secondary.

20. A non-transitory computer-readable medium as described in claim 19, wherein the executed method further comprising: optimizing display settings of the first display device relative to the second display device based on the configuring of the output functionality and the input functionality of the first display device, and wherein the optimizing of the display settings comprises one or more selected from a group consisting of: adjusting a display resolution for the first display device so the display resolution of the first display device is higher than a display resolution of the second display device; and adjusting a display brightness for the first display device so the display brightness of the first display device is higher than a display brightness of the second display device.

* * * * *